United States Patent
Wajs

(10) Patent No.: US 8,917,349 B2
(45) Date of Patent: Dec. 23, 2014

(54) FLASH SYSTEM FOR MULTI-APERTURE IMAGING

(75) Inventor: Andrew Augustine Wajs, Haarlem (NL)

(73) Assignee: Dual Aperture, Inc., Palo Alto, CA (US)

( * ) Notice: Subject to any disclaimer, the term of this patent is extended or adjusted under 35 U.S.C. 154(b) by 0 days.

(21) Appl. No.: 13/810,227

(22) PCT Filed: Jul. 16, 2010

(86) PCT No.: PCT/EP2010/060282
§ 371 (c)(1),
(2), (4) Date: Jan. 15, 2013

(87) PCT Pub. No.: WO2012/007049
PCT Pub. Date: Jan. 19, 2012

(65) Prior Publication Data
US 2013/0113988 A1 May 9, 2013

(51) Int. Cl.
| H04N 5/238 | (2006.01) |
| H04N 5/235 | (2006.01) |
| H04N 5/225 | (2006.01) |
| H04N 5/33 | (2006.01) |

(52) U.S. Cl.
CPC ............ *H04N 5/2353* (2013.01); *H04N 5/225* (2013.01); *H04N 5/332* (2013.01); *H04N 5/2354* (2013.01)
USPC ...................................... 348/363; 348/229.1

(58) Field of Classification Search
USPC ............... 348/272–280, 294–308, 362–371
See application file for complete search history.

(56) References Cited

U.S. PATENT DOCUMENTS

| 5,148,209 A * | 9/1992 | Subbarao ...................... 396/93 |
| 5,231,443 A * | 7/1993 | Subbarao ...................... 396/93 |
| 5,280,388 A * | 1/1994 | Okayama et al. .............. 359/569 |
| 6,034,372 A * | 3/2000 | LeVan ........................... 250/352 |

(Continued)

FOREIGN PATENT DOCUMENTS

| GB | 2463480 | 3/2010 |
| JP | 2002-207159 | 7/2002 |

(Continued)

OTHER PUBLICATIONS

International Search Report, mailed Apr. 18, 2011 in connection with International Patent Application PCT/EP2010/060282.

(Continued)

*Primary Examiner* — Tuan Ho
*Assistant Examiner* — Selam Gebriel
(74) *Attorney, Agent, or Firm* — Steven M. Koehler; Westman, Champlin & Koehler, P.A.

(57) ABSTRACT

A method and a system for forming an image of a scene are provided. The method includes capturing an image of the scene by exposing an image sensor to radiation from one part of the EM spectrum using one aperture and to radiation from another part of the EM spectrum using another aperture having a different size than the first aperture. Simultaneously with capturing the image, the scene is illuminated with radiation from the second part of the EM spectrum. The image is then formed on the basis of image data generated by the radiation from the first part of the EM spectrum and image data generated by radiation from the second part of the EM spectrum.

14 Claims, 18 Drawing Sheets

(56) References Cited

U.S. PATENT DOCUMENTS

| | | | |
|---|---|---|---|
| 7,400,458 B2 * | 7/2008 | Farr | 359/738 |
| 7,579,577 B2 | 8/2009 | Ono | |
| 2003/0052992 A1 | 3/2003 | Nakata | |
| 2005/0046969 A1 * | 3/2005 | Beatson et al. | 359/738 |
| 2006/0197006 A1 | 9/2006 | Kochi | |
| 2007/0127908 A1 | 6/2007 | Oon et al. | |
| 2007/0133983 A1 * | 6/2007 | Traff | 396/506 |
| 2008/0316345 A1 | 12/2008 | Onodera | |
| 2009/0159799 A1 | 6/2009 | Copeland | |
| 2010/0033604 A1 * | 2/2010 | Solomon | 348/241 |
| 2010/0066854 A1 * | 3/2010 | Mather et al. | 348/222.1 |
| 2010/0157019 A1 * | 6/2010 | Schwotzer et al. | 348/46 |
| 2010/0238343 A1 * | 9/2010 | Kawarada | 348/345 |
| 2014/0078376 A1 * | 3/2014 | Shuster | 348/348 |

FOREIGN PATENT DOCUMENTS

| | | |
|---|---|---|
| WO | 2010081556 | 7/2010 |
| WO | 2011023224 | 3/2011 |
| WO | 2011101035 | 8/2011 |
| WO | 2011101036 | 8/2011 |

OTHER PUBLICATIONS

Article Green et al., Multi-Aperture Photography, ACM Transactions on Graphics, 26(3), Jul. 2007, pp. 68:1-68:7.

Notice of Reasons for Rejection for corresponding Japanese Application 2013-518959, mailed Mar. 31, 2014.

Communication from the European Patent Office for related foreign application 10 734 973.0-1902 dated Jul. 8, 2014.

* cited by examiner

FLASH SYSTEM FOR MULTI-APERTURE IMAGING

PRIORITY CLAIM(S) AND/OR CROSS REFERENCE(S) TO RELATED APPLICATION(S)

This application is a national stage application under 35 U.S.C. §371 of PCT/EP2010/060282 filed Jul. 16, 2010, published as WO 2012/007049 A1 on Jan. 19, 2012, which application and publication are incorporated herein by reference and made a part hereof in its entirety, and the benefit of priority of which is claimed herein.

FIELD OF THE INVENTION

The invention relates to processing multi-aperture image data, and, in particular, though not exclusively, to a method and a system for forming an image of a scene and a computer program product using such method.

BACKGROUND OF THE INVENTION

A limitation that exists in all optical systems used in cameras today is the tradeoff between aperture and the depth of field (DOF). An aperture determines the amount of light that enters the camera and the DOF determines the range of distances from the camera that are in focus when the image is captured. The wider the aperture (the more light received) the more limited the DOF.

In many applications the tradeoff between aperture and the DOF becomes apparent. For example, most mobile phones have fixed focus lenses so that only subject within a limited range is in focus. It also places a constraint on the aperture setting of the camera in that the camera must have a relatively small aperture to ensure that as many objects as possible are in focus. This tradeoff reduces the camera's performance in low light situations typically reducing the shutter speed by a factor of 4 or 8.

Further, in low light applications a wide aperture is required, which results in a loss of DOF. In pictures where objects are at different distances from the camera some of the objects will be out of focus even with a focusing lens. Wide aperture lenses require greater precision for optical performance and are therefore expensive.

Techniques to increase the DOF are known in the prior art. One technique referred to as "focus stacking" combines multiple images taken at subsequent points in time and at different focus distances in order to generate a resulting image with a greater depth of field DOF than any of the individual source images. Implementation of focus stacking requires adaptations of the camera electronics and substantial (non-linear) processing and image analyses of relatively large amounts of image data. Moreover, as the focus stacking requires multiple images taken at subsequent moments in time this technique is sensitive to motion blur.

Another approach is described in an article by Green et al., "Multi-aperture photography", ACM Transactions on Graphics, 26(3), Jul. 2007, pp. 68:1-68:7. In this article the authors propose to increase the FOD using a system that simultaneously captures multiple images with different aperture sizes. The system uses an aperture splitting mirror which splits the aperture in a central disc and a set of concentric rings. The aperture splitting mirror however is complex to fabricate and produces high optical aberrations. Moreover, implementation of such splitting mirror in a camera requires a relative complex optical system which requires precise alignment.

Hence, there is a need in the prior art for a simple and cheap methods and systems for improving the depth of field in an imaging system.

PCT applications with international patent application numbers PCT/EP2009/050502 and PCT/EP2009/060936, which are hereby incorporated by reference, describe ways to extend the depth of field of a fixed focus lens imaging system through use of an optical system which combines both color and infrared imaging techniques. The combined use of an image sensor which is adapted for imaging both in the color and the infrared spectrum and a wavelength selective multi-aperture aperture allows extension of depth of field and increase of the ISO speed for digital cameras with a fixed focus lens in a simple and cost effective way. It requires minor adaptations to known digital imaging systems thereby making this process especially suitable for mass production.

Further, PCT applications with international patent application numbers PCT/EP2010/052151 and PCT/EP2010/052154, which are also hereby incorporated by reference, describe ways to generate depth maps through use of a multi-aperture imaging system.

Although the use of a multi-aperture imaging system provides substantial advantages over known digital imaging systems, there is need in the art for methods and systems which may provide multi-aperture imaging systems with still further enhanced functionality.

SUMMARY OF THE INVENTION

It is an object of the invention to reduce or eliminate at least one of the drawbacks known in the prior art. In a first aspect the invention is related to a method for forming an image of a scene. The method includes the steps of capturing a first image of the scene by exposing an image sensor to radiation from a first part of the electromagnetic (EM) spectrum using at least a first aperture and to radiation from a second part of the EM spectrum using at least a second aperture having a different size than the first aperture and forming the image of the scene on the basis of image data of the first image generated by the radiation from the first part of the EM spectrum and on the basis of image data of the first image generated by radiation from the second part of the EM spectrum. Simultaneously with capturing the first image, the scene is illuminated with the radiation from the second part of the EM spectrum.

As used herein, "illuminating the scene with radiation" implies illuminating the scene with EM radiation of optical wavelengths (e.g. infrared, visible, or ultraviolet radiation). Furthermore, as used herein, "illuminating the scene with radiation simultaneously with capturing the image" implies that the act of illumination coincides with at least a part of the act of the exposure of the image sensor to radiation. The duration of illumination can be smaller than the duration of the exposure of the image sensor to radiation.

By exposing an image sensor with radiation from two different apertures the DOF of the optical system can be improved in a very simple way. The method allows a fixed focus lens to have a relatively wide aperture, hence effectively operating in lower light situations, while at the same time providing a greater DOF resulting in sharper pictures. Further, the method effectively increase the optical performance of lenses, reducing the cost of a lens required to achieve the same performance.

In a second aspect, the invention is related to a multi-aperture imaging system for forming an image of a scene. The system includes a flash, an image sensor, a wavelength-selective multi-aperture, and a processing module. The wavelength-selective multi-aperture is configured for capturing a first image by exposing the image sensor to radiation from a first part of the EM spectrum using at least a first aperture and to radiation from a second part of the EM spectrum using at least a second aperture having a different size than the first aperture. The processing module is configured for forming an image of the scene on the basis of image data of the first image generated by the radiation from the first part of the EM spectrum and on the basis of image data of the first image generated by radiation from the second part of the EM spectrum. The flash is configured for illuminating the scene with radiation from the second part of the EM spectrum simultaneously capturing the first image.

Claims 2-5, 11, and 12 provide various advantageous embodiments for setting illumination parameters. The illumination parameters may include e.g. intensity and/or duration of the illumination of the scene with radiation from the second part of the EM spectrum.

Claim 6 allows interrupting illumination when the level of radiation in the second part of the EM spectrum reaches a predetermined threshold. Such a threshold may include e.g. the intensity of the radiation in the second part of the EM spectrum reaching a certain absolute value or reaching a certain level with respect to the radiation from the first part of the EM spectrum.

Claim 7 provides that a single exposure of the image sensors allows efficient capturing of both small aperture and large aperture image information thus reducing effects of motion blur which occur when using conventional techniques like focus stacking.

Claim 8 provides an embodiment where the sharp image information can be easily accessed via the high-frequency information produced by the small aperture image data.

Claim 9 provides that first part of the electromagnetic spectrum may be associated with at least part of the visible spectrum and/or said second part of the electromagnetic spectrum may be associated with at least part of the invisible spectrum, preferably the infrared spectrum. The use of the infrared spectrum allows efficient use of the sensitivity of the image sensor thereby allowing significant improvement of the signal to noise ratio.

The optical characteristics of the aperture system can be easily modified and optimized with regard to the type of image sensor and/or optical lens system used in an optical system. One embodiment may employ the sensitivity of silicon image sensors to infra-red radiation.

Further aspects of the invention relate to a flash controller for use in a multi-aperture imaging system as described above.

Further aspects of the invention relate to digital camera system, preferably digital camera system for use in a mobile terminal, comprising a multi-aperture imaging system as describe above and to a computer program product for processing image data, wherein said computer program product comprises software code portions configured for, when run in the memory of a computer system, executing the method as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
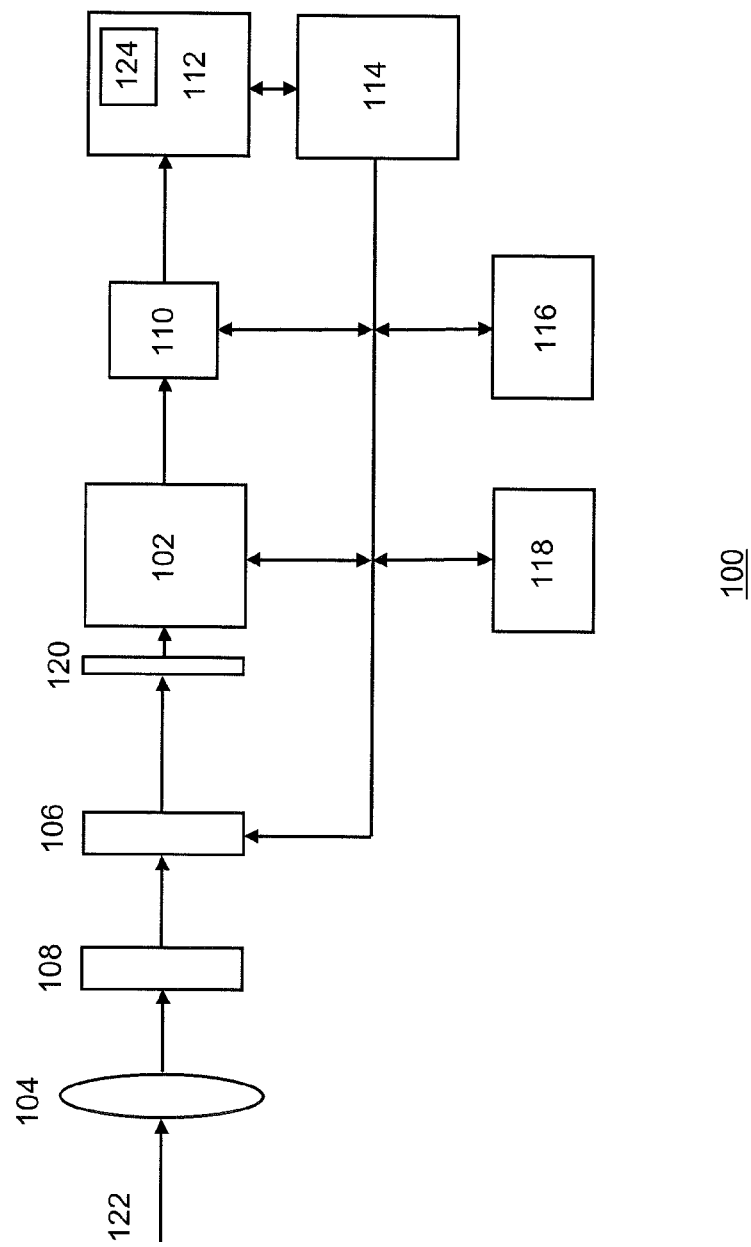
FIG. 1 depicts a multi-aperture imaging system according to one embodiment of the invention.

FIG. 1 illustrates a multi-aperture imaging system 100 according to one embodiment of the invention. The imaging system may be part of a digital camera or integrated in a mobile phone, a webcam, a biometric sensor, image scanner or any other multimedia device requiring image-capturing functionality. The system depicted in FIG. 1 comprises an image sensor 102, a lens system 104 for focusing objects in a scene onto the imaging plane of the image sensor, a shutter 106 and an aperture system 108 comprising a predetermined number apertures for allowing light (electromagnetic radiation) of a first part, e.g. a visible part, and at least a second part of the EM spectrum, e.g. a non-visible part such as part of the infrared) of the electromagnetic (EM) spectrum to enter the imaging system in a controlled way.

The multi-aperture system 108, which will be discussed hereunder in more detail, is configured to control the exposure of the image sensor to light in the visible part and, optionally, the invisible part, e.g. the infrared part, of the EM spectrum. In particular, the multi-aperture system may define at a least first aperture of a first size for exposing the image sensor with a first part of the EM spectrum and at least a second aperture of a second size for exposing the image sensor with a second part of the EM spectrum. For example, in one embodiment the first part of the EM spectrum may relate to the color spectrum and the second part to the infrared spectrum. In another embodiment, the multi-aperture system may comprise a predetermined number of apertures each designed to expose the image sensor to radiation within a predetermined range of the EM spectrum.

The exposure of the image sensor to EM radiation is controlled by the shutter 106 and the apertures of the multi-aperture system 108. When the shutter is opened, the aperture system controls the amount of light and the degree of collimation of the light exposing the image sensor 102. The shutter may be a mechanical shutter or, alternatively, the shutter may be an electronic shutter integrated in the image sensor. The image sensor comprises rows and columns of photosensitive sites (pixels) forming a two dimensional pixel array. The image sensor may be a CMOS (Complimentary Metal Oxide Semiconductor) active pixel sensor or a CCD (Charge Coupled Device) image sensor. Alternatively, the image sensor may relate to other Si (e.g. a-Si), III-V (e.g. GaAs) or conductive polymer based image sensor structures.

When the light is projected by the lens system onto the image sensor, each pixel produces an electrical signal, which is proportional to the electromagnetic radiation (energy) incident on that pixel. In order to obtain color information and to separate the color components of an image which is projected onto the imaging plane of the image sensor, typically a color filter array 120 (CFA) is interposed between the lens and the image sensor. The color filter array may be integrated with the image sensor such that each pixel of the image sensor has a corresponding pixel filter. Each color filter is adapted to pass light of a predetermined color band into the pixel. Usually a combination of red, green and blue (RGB) filters is used, however other filter schemes are also possible, e.g. CYGM (cyan, yellow, green, magenta), RGBE (red, green, blue, emerald), etc.

Each pixel of the exposed image sensor produces an electrical signal proportional to the electromagnetic radiation passed through the color filter associated with the pixel. The array of pixels thus generates image data (a frame) representing the spatial distribution of the electromagnetic energy (radiation) passed through the color filter array. The signals received from the pixels may be amplified using one or more on-chip amplifiers. In one embodiment, each color channel of the image sensor may be amplified using a separate amplifier, thereby allowing to separately control the ISO speed for different colors.

Further, pixel signals may be sampled, quantized and transformed into words of a digital format using one or more Analog to Digital (A/D) converters 110, which may be integrated on the chip of the image sensor. The digitized image data are processed by a digital signal processor 112 (DSP) coupled to the image sensor, which is configured to perform well known signal processing functions such as interpolation, filtering, white balance, brightness correction, data compression techniques (e.g. MPEG or JPEG type techniques). The DSP is coupled to a central processor 114, storage memory 116 for storing captured images and a program memory 118 such as EEPROM or another type of nonvolatile memory comprising one or more software programs used by the DSP for processing the image data or used by a central processor for managing the operation of the imaging system.

Further, the DSP may comprise one or more signal processing functions 124 configured for obtaining depth information associated with an image captured by the multi-aperture imaging system. These signal processing functions may provide a fixed-lens multi-aperture imaging system with extended imaging functionality including variable DOF and focus control and stereoscopic 3D image viewing capabilities. The details and the advantages associated with these signal processing functions will be discussed hereunder in more detail.

As described above, the sensitivity of the imaging system is extended by using infrared imaging functionality. To that end, the lens system may be configured to allow both visible light and infrared radiation or at least part of the infrared radiation to enter the imaging system. Filters in front of lens system are configured to allow at least part of the infrared radiation entering the imaging system. In particular, these filters do not comprise infrared blocking filters, usually referred to as hot-mirror filters, which are used in conventional color imaging cameras for blocking infrared radiation from entering the camera.

Hence, the EM radiation 122 entering the multi-aperture imaging system may thus comprise both radiation associated with the visible and the infrared parts of the EM spectrum thereby allowing extension of the photo-response of the image sensor to the infrared spectrum.

Figure 2:
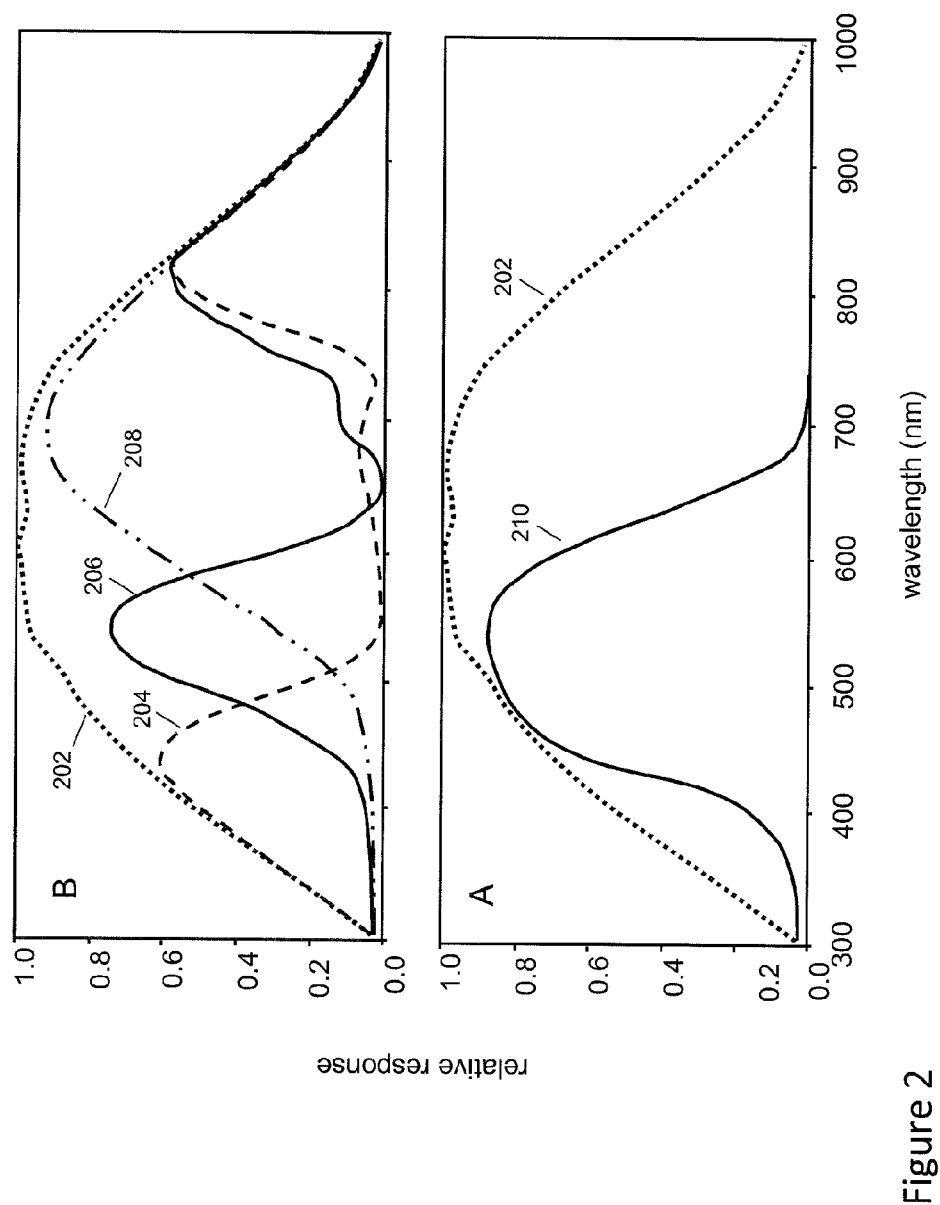
FIG. 2 depicts color responses of a digital camera.
Figure 3:
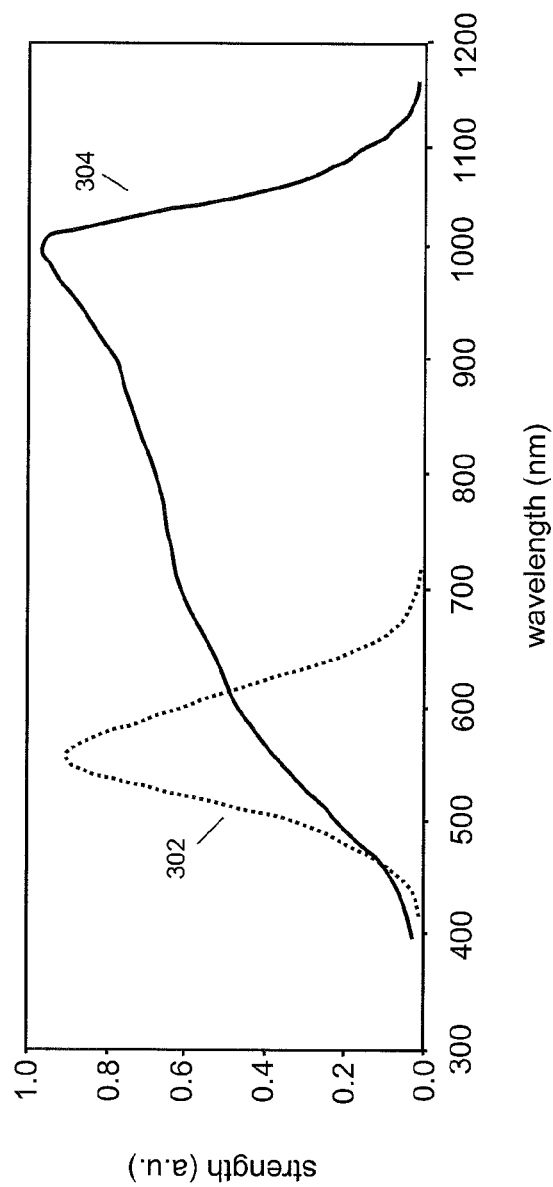
FIG. 3 depicts the response of a hot mirror filter and the response of Silicon.

The effect of (the absence of) an infrared blocking filter on a conventional CFA color image sensor is illustrated in FIG. 2-3. In FIGS. 2A and 2B, curve 202 represents a typical color response of a digital camera without an infrared blocking filter (hot mirror filter). Graph A illustrates in more detail the effect of the use of a hot mirror filter. The response of the hot mirror filter 210 limits the spectral response of the image sensor to the visible spectrum thereby substantially limiting the overall sensitivity of the image sensor. If the hot mirror filter is taken away, some of the infrared radiation will pass through the color pixel filters. This effect is depicted by graph B illustrating the photo-responses of conventional color pixels comprising a blue pixel filter 204, a green pixel filter 206 and a red pixel filter 208. The color pixel filters, in particular the red pixel filter, may (partly) transmit infrared radiation so that a part of the pixel signal may be attributed to infrared radiation. These infrared contributions may distort the color balance resulting into an image comprising so-called false colors.

FIG. 3 depicts the response of the hot mirror filter 302 and the response of Silicon 304 (i.e. the main semiconductor component of an image sensor used in digital cameras). These responses clearly illustrates that the sensitivity of a Silicon image sensor to infrared radiation is approximately four times higher than its sensitivity to visible light.

In order to take advantage of the spectral sensitivity provided by the image sensor as illustrated by FIGS. 2 and 3, the image sensor 102 in the imaging system in FIG. 1 may be a conventional image sensor. In a conventional RGB sensor, the infrared radiation is mainly sensed by the red pixels. In that case, the DSP may process the red pixel signals in order to extract the low-noise infrared information therein. This process will be described hereunder in more detail. Alternatively, the image sensor may be especially configured for imaging at least part of the infrared spectrum. The image sensor may comprise for example one or more infrared (I) pixels in conjunction with color pixels thereby allowing the image sensor to produce a RGB color image and a relatively low-noise infrared image.

An infrared pixel may be realized by covering a photo-site with a filter material, which substantially blocks visible light and substantially transmits infrared radiation, preferably infrared radiation within the range of approximately 700 through 1100 nm. The infrared transmissive pixel filter may be provided in an infrared/color filter array (ICFA) may be realized using well known filter materials having a high transmittance for wavelengths in the infrared band of the spectrum, for example a black polyimide material sold by Brewer Science under the trademark "DARC 400".

Methods to realize such filters are described in US2009/0159799. An ICFA may contain blocks of pixels, e.g. 2×2 pixels, wherein each block comprises a red, green, blue and infrared pixel. When being exposed, such image ICFA color image sensor may produce a raw mosaic image comprising both RGB color information and infrared information. After processing the raw mosaic image using a well-known demosaicking algorithm, a RGB color image and an infrared image may obtained. The sensitivity of such ICFA image color sensor to infrared radiation may be increased by increasing the number of infrared pixels in a block. In one configuration (not shown), the image sensor filter array may for example comprise blocks of sixteen pixels, comprising four color pixels RGGB and twelve infrared pixels.

Instead of an ICFA image color sensor, in another embodiment, the image sensor may relate to an array of photo-sites wherein each photo-site comprises a number of stacked photodiodes well known in the art. Preferably, such stacked photo-site comprises at least four stacked photodiodes responsive to at least the primary colors RGB and infrared respectively. These stacked photodiodes may be integrated into the Silicon substrate of the image sensor.

Figure 4:
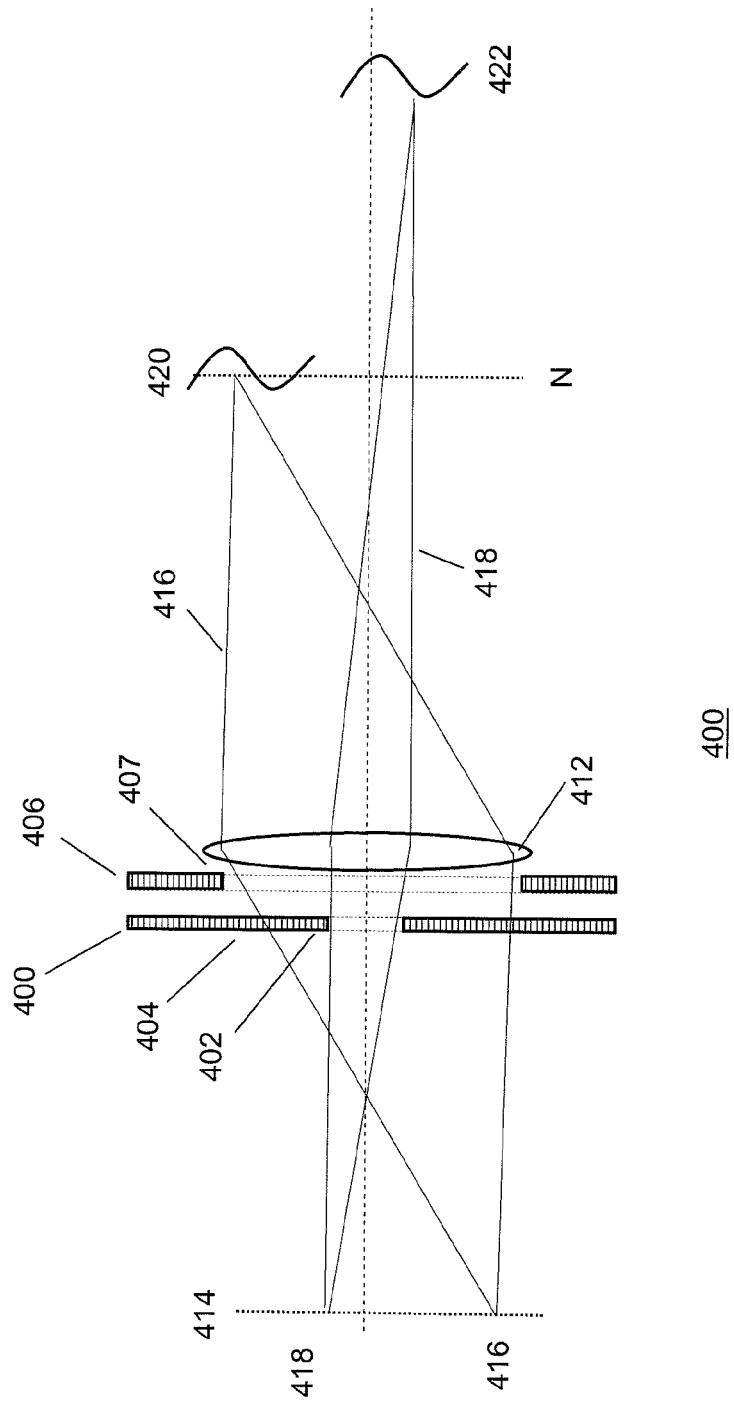
FIG. 4 depicts a schematic optical system using a multi-aperture system.

The multi-aperture system, e.g. a multi-aperture diaphragm, may be used to improve the depth of field (DOE) of the camera. The principle of such multi-aperture system 400 is illustrated in FIG. 4. The DOF determines the range of distances from the camera that are in focus when the image is captured. Within this range the object is acceptable sharp. For moderate to large distances and a given image format, DOF is determined by the focal length of the lens N, the f-number associated with the lens opening (the aperture), and the object-to-camera distance s. The wider the aperture (the more light received) the more limited the DOF.

Visible and infrared spectral energy may enter the imaging system via the multi-aperture system. In one embodiment, such multi-aperture system may comprise a filter-coated transparent substrate with a circular hole 402 of a predetermined diameter D1. The filter coating 404 may transmit visible radiation and reflect and/or absorb infrared radiation. An opaque covering 406 may comprise a circular opening with a diameter D2, which is larger than the diameter D1 of the hole 402. The cover may comprise a thin-film coating which reflects both infrared and visible radiation or, alternatively, the cover may be part of an opaque holder for holding and positioning the substrate in the optical system. This way the multi-aperture system comprises multiple wavelength-selective apertures allowing controlled exposure of the image sensor to spectral energy of different parts of the EM spectrum. Visible and infrared spectral energy passing the aperture system is subsequently projected by the lens 412 onto the imaging plane 414 of an image sensor comprising pixels for obtaining image data associated with the visible spectral energy and pixels for obtaining image data associated with the non-visible (infrared) spectral energy.

The pixels of the image sensor may thus receive a first (relatively) wide-aperture image signal 416 associated with visible spectral energy having a limited DOF overlaying a second small-aperture image signal 418 associated with the infrared spectral energy having a large DOF. Objects 420 close to the plane of focus N of the lens are projected onto the image plane with relatively small defocus blur by the visible radiation, while objects 422 further located from the plane of focus are projected onto the image plane with relatively small defocus blur by the infrared radiation. Hence, contrary to conventional imaging systems comprising a single aperture, a dual or a multiple aperture imaging system uses an aperture system comprising two or more apertures of different sizes for controlling the amount and the collimation of radiation in different bands of the spectrum exposing the image sensor.

Figure 5:
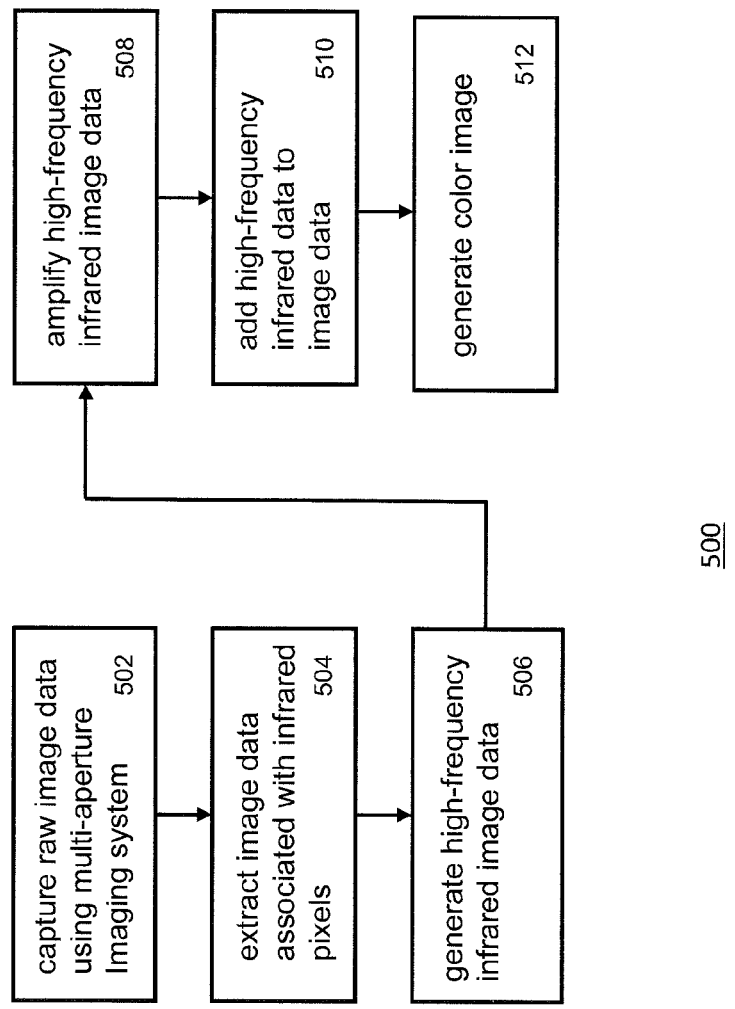
FIG. 5 depicts an image processing method for use with a multi-aperture imaging system according to one embodiment of the invention.

The DSP may be configured to process the captured color and infrared signals. FIG. 5 depicts typical image processing steps 500 for use with a multi-aperture imaging system. In this example, the multi-aperture imaging system comprises a conventional color image sensor using e.g. a Bayer color filter array. In that case, it is mainly the red pixel filters that transmit the infrared radiation to the image sensor. The red color pixel data of the captured image frame comprises both a high-amplitude visible red signal and a sharp, low-amplitude non-visible infrared signal. The infrared component may be 8 to 16 times lower than the visible red component. Further, using known color balancing techniques the red balance may be adjusted to compensate for the slight distortion created by the presence of infrared radiation. In other variants, the an RGBI image sensor may be used wherein the infrared image may be directly obtained by the I-pixels.

In a first step 502 Bayer filtered raw image data are captured. Thereafter, the DSP may extract the red color image data, which also comprises the infrared information (step 504). Thereafter, the DSP may extract the sharpness information associated with the infrared image from the red image data and use this sharpness information to enhance the color image.

One way of extracting the sharpness information in the spatial domain may be achieved by applying a high pass filter to the red image data. A high-pass filter may retain the high frequency information (high frequency components) within the red image while reducing the low frequency information (low frequency components). The kernel of the high pass filter may be designed to increase the brightness of the centre pixel relative to neighbouring pixels. The kernel array usually contains a single positive value at its centre, which is completely surrounded by negative values. A simple non-limiting example of a 3×3 kernel for a high-pass filter may look like:

$|-1/9\ -1/9\ -1/9|$
$|-1/9\ \ 8/9\ -1/9|$
$|1/9\ -1/9\ -1/9|$

Hence, the red image data are passed through a high-pass filter (step 506) in order to extract the high-frequency components (i.e. the sharpness information) associated with the infrared image signal.

As the relatively small size of the infrared aperture produces a relatively small infrared image signal, the filtered high-frequency components are amplified in proportion to the ratio of the visible light aperture relative to the infrared aperture (step 508).

The effect of the relatively small size of the infra-red aperture is partly compensated by the fact that the band of infrared radiation captured by the red pixel is approximately four times wider than the band of red radiation (typically a digital infra-red camera is four times more sensitive than a visible light camera). In one embodiment, the effect of the relatively small size of the infrared aperture may also be compensated by illuminating the objects to be imaged with an infrared flash at the time when raw image data is captured (flash is described in greater detail below in association with FIGS. 15-17). After amplification, the amplified high-frequency components derived from the infrared image signal are added to (blended with) each color component of the Bayer filtered raw image data (step 510). This way the sharpness information of the infrared image data is added to the color image. Thereafter, the combined image data may be transformed into a full RGB color image using a demosaicking algorithm well known in the art (step 512).

In a variant (not shown) the Bayer filtered raw image data are first demosaicked into a RGB color image and subsequently combined with the amplified high frequency components by addition (blending).

The method depicted in FIG. 5 allows the multi-aperture imaging system to have a wide aperture for effective operation in lower light situations, while at the same time to have a greater DOF resulting in sharper pictures. Further, the method effectively increase the optical performance of lenses, reducing the cost of a lens required to achieve the same performance.

The multi-aperture imaging system thus allows a simple mobile phone camera with a typical f-number of 7 (e.g. focal length N of 7 mm and a diameter of 1 mm) to improve its DOF via a second aperture with a f-number varying e.g. between 14 for a diameter of 0.5 mm up to 70 or more for diameters equal to or less than 0.2 mm, wherein the f-number is defined by the ratio of the focal length f and the effective diameter of the aperture. Preferable implementations include optical systems comprising an f-number for the visible radiation of approximately 2 to 4 for increasing the sharpness of near objects in combination with an f-number for the infrared aperture of approximately 16 to 22 for increasing the sharpness of distance objects.

The improvements in the DOF and the ISO speed provided by a multi-aperture imaging system are described in more detail in related applications PCT/EP2009/050502 and PCT/EP2009/060936. In addition, the multi-aperture imaging system as described with reference to FIG. 1-5, may be used for generating depth information associated with a single captured image. More in particular, the DSP of the multi-aperture imaging system may comprise at least one depth function, which depends on the parameters of the optical system and which in one embodiment may be determined in advance by the manufacturer and stored in the memory of the camera for use in digital image processing functions.

An image may contain different objects located at different distances from the camera lens so that objects closer to the focal plane of the camera will be sharper than objects further away from the focal plane. A depth function may relate sharpness information associated with objects imaged in different areas of the image to information relating to the distance from which these objects are removed from the camera. In one embodiment, a depth function R may involve determining the ratio of the sharpness of the color image components and the infrared image components for objects at different distances away from the camera lens. In another embodiment, a depth function D may involve autocorrelation analyses of the high-pass filtered infrared image. These embodiments are described hereunder in more detail with reference to FIG. 6-14.

In a first embodiment, a depth function R may be defined by the ratio of the sharpness information in the color image and the sharpness information in the infrared image. Here, the sharpness parameter may relate to the so-called circle of confusion, which corresponds to the blur spot diameter measured by the image sensor of an unsharply imaged point in object space. The blur disk diameter representing the defocus blur is very small (zero) for points in the focus plane and progressively grows when moving away to the foreground or background from this plane in object space. As long as the blur disk is smaller than the maximal acceptable circle of confusion c, it is considered sufficiently sharp and part of the DOF range. From the known DOF formulas it follows that there is a direct relation between the depth of an object, i.e. its distance s from the camera, and the amount of blur (i.e. the sharpness) of that object in the camera.

Hence, in a multi-aperture imaging system, the increase or decrease in sharpness of the RGB components of a color image relative to the sharpness of the IR components in the infrared image depends on the distance of the imaged object from the lens. For example, if the lens is focused at 3 meters, the sharpness of both the RGB components and the IR components may be the same. In contrast, due to the small aperture used for the infrared image for objects at a distance of 1 meter, the sharpness of the RGB components may be significantly less than those of the infra-red components. This dependence may be used to estimate the distances of objects from the camera lens.

Figure 6A:
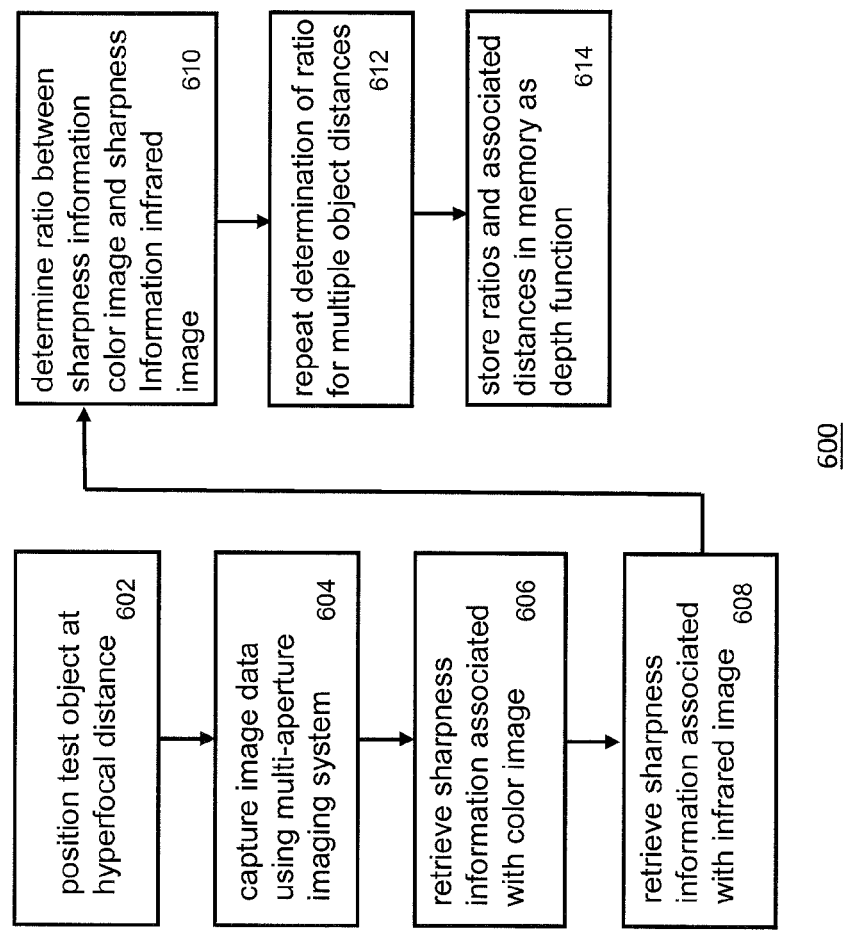
FIG. 6A depicts a method for determining of a depth function according to one embodiment of the invention.

In particular, if the lens is set to a large ("infinite") focus point (this point may be referred to as the hyperfocal distance H of the multi-aperture system), the camera may determine the points in an image where the color and the infrared components are equally sharp. These points in the image correspond to objects, which are located at a relatively large distance (typically the background) from the camera. For objects located away from the hyperfocal distance H, the relative difference in sharpness between the infrared components and the color components will increase as a function of the distance s between the object and the lens. The ratio between the sharpness information in the color image and the sharpness information in the infrared information measured at one spot (e.g. one or a group of pixels) will hereafter be referred to as the depth function $R(s)$. The depth function $R(s)$ may be obtained by measuring the sharpness ratio for one or more test objects at different distances s from the camera lens, wherein the sharpness is determined by the high frequency components in the respective images. FIG. 6A depicts a flow diagram 600 associated with the determination of a depth function according to one embodiment of the invention. In a first step 602, a test object may be positioned at least at the hyperfocal distance H from the camera. Thereafter, image data are captured using the multi-aperture imaging system. Then, sharpness information associated with a color image and infrared information is extracted from the captured data (steps 606-608). The ratio between the sharpness information $R(H)$ is subsequently stored in a memory (step 610). Then the test object is moved over a distance $\Delta$ away from the hyperfocal distance H and R is determined at this distance. This process is repeated until R is determined for all distances up to close to the camera lens (step 612). These values may be stored into the memory. Interpolation may be used in order to obtain a continuous depth function $R(s)$ (step 614).

In one embodiment, R may be defined as the ratio between the absolute value of the high-frequency infrared components $D_{ir}$ and the absolute value of the high-frequency color components $D_{col}$ measured at a particular spot in the image. In another embodiment, the difference between the infrared and color components in a particular area may be calculated. The sum of the differences in this area may then be taken as a measure of the distance.

Figure 6B:
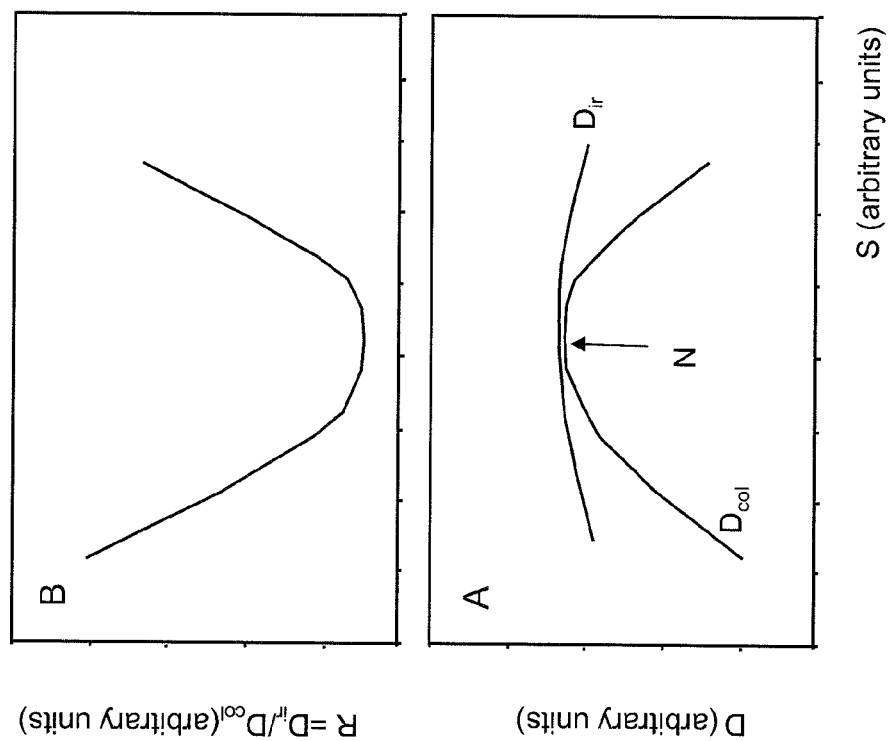
FIG. 6B depicts a schematic of a depth function and graph depicting high-frequency color and infrared information as a function of distance.

FIG. 6B depicts a plot of $D_{col}$ and $D_{ir}$ as a function of distance (graph A) and a plot of $R=D_{ir}/D_{col}$ as a function of distance (graph B). In graph A it shown that around the focal distance N the high-frequency color components have the highest values and that away from the focal distance high-frequency color components rapidly decrease as a result of blurring effects. Further, as a result of the relatively small infrared aperture, the high-frequency infrared components will have relatively high values over a large distance away from the focal point N.

Figure 7:
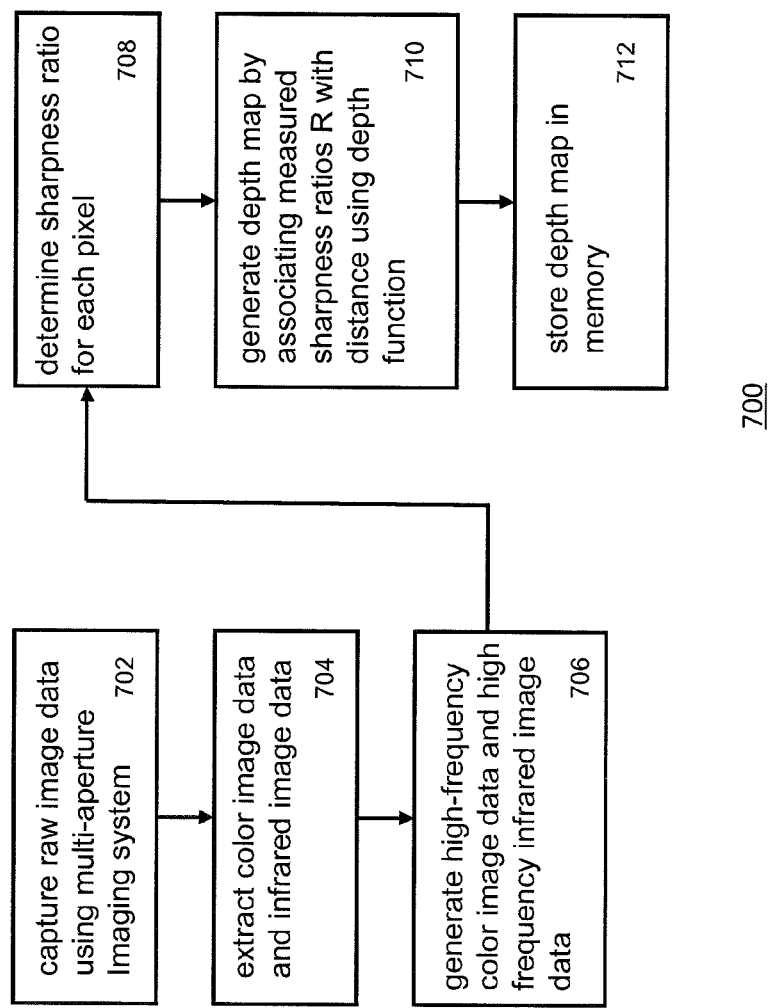
FIG. 7 depicts a method for generating a depth map according to one embodiment of the invention.

Graph B depicts the resulting depth function R defined as the ratio between $D_{ir}/D_{col}$, indicating that for distances substantially larger than the focal distance N the sharpness information is comprised in the high-frequency infrared image data. The depth function R(s) may be obtained by the manufacturer in advance and may be stored in the memory of the camera, where it may be used by the DSP in one or more post-processing functions for processing an image captured by the multi-aperture imaging system. In one embodiment one of the post-processing functions may relate to the generation of a depth map associated with a single image captured by the multi-aperture imaging system. FIG. 7 depicts a schematic of a process for generating such depth map according to one embodiment of the invention. After the image sensor in the multi-aperture imaging system captures both visible and infrared image signals simultaneously in one image frame (step 702), the DSP may separate the color and infrared pixel signals in the captured raw mosaic image using e.g. a known demosaicking algorithm (step 704). Thereafter, the DSP may use a high-pass filter on the color image data (e.g. an RGB image) and the infrared image data in order to obtain the high frequency components of both image data (step 706).

Thereafter, the DSP may associate a distance to each pixel p(i,j) or a group of pixels. To that end, the DSP may determine for each pixel p(I,j) the sharpness ratio R(i,j) between the high frequency infrared components and the high frequency color components: $R(i,j)=D_{ir}(i,j)/D_{col}(i,j)$ (step 708). On the basis of depth function R(s), in particular the inverse depth function R'(R), the DSP may then associate the measured sharpness ratio R(i,j) at each pixel with a distance s(i,j) to the camera lens (step 710). This process will generate a distance map wherein each distance value in the map is associated with a pixel in the image. The thus generated map may be stored in a memory of the camera (step 712).

Assigning a distance to each pixel may require large amount of data processing. In order to reduce the amount of computation, in one variant, in a first step edges in the image may be detected using a well known edge-detection algorithm. Thereafter, the areas around these edges may be used as sample areas for determining distances from the camera lens using the sharpness ration R in these areas. This variant provides the advantage that it requires less computation.

Hence, on the basis of an image, i.e. a pixel frame {p(i,j)}, captured by a multi-aperture camera system, the digital imaging processor comprising the depth function may determine an associated depth map {s(i,j)}. For each pixel in the pixel frame the depth map comprises an associated distance value. The depth map may be determined by calculating for each pixel p(i,j) an associated depth value s(i,j). Alternatively, the depth map may be determined by associating a depth value with groups of pixels in an image. The depth map may be stored in the memory of the camera together with the captured image in any suitable data format.

The process is not limited to the steps described with reference to FIG. 7. Various variants are possible without departing from the invention. For example, of the high-pass filtering may applied before the demosaicking step. In that case, the high-frequency color image is obtained by demosaicking the high-pass filtered image data.

Further, other ways of determining the distance on the basis of the sharpness information are also possible without departing from the invention. For example instead of analyzing sharpness information (i.e. edge information) in the spatial domain using e.g. a high-pass filter, the sharpness information may also be analyzed in the frequency domain. For example in one embodiment, a running Discrete Fourier Transform (DFT) may be used in order obtain sharpness information. The DFT may be used to calculate the Fourier coefficients of both the color image and the infrared image. Analysis of these coefficients, in particular the high-frequency coefficient, may provide an indication of distance.

For example, in one embodiment the absolute difference between the high-frequency DFT coefficients associated with a particular area in the color image and the infrared image may be used as an indication for the distance. In a further embodiment, the Fourier components may used for analyzing the cutoff frequency associated with infrared and the color signals. For example if in a particular area of the image the cutoff frequency of the infrared image signals is larger than the cutoff frequency of the color image signal, then this difference may provide an indication of the distance.

Figure 8:
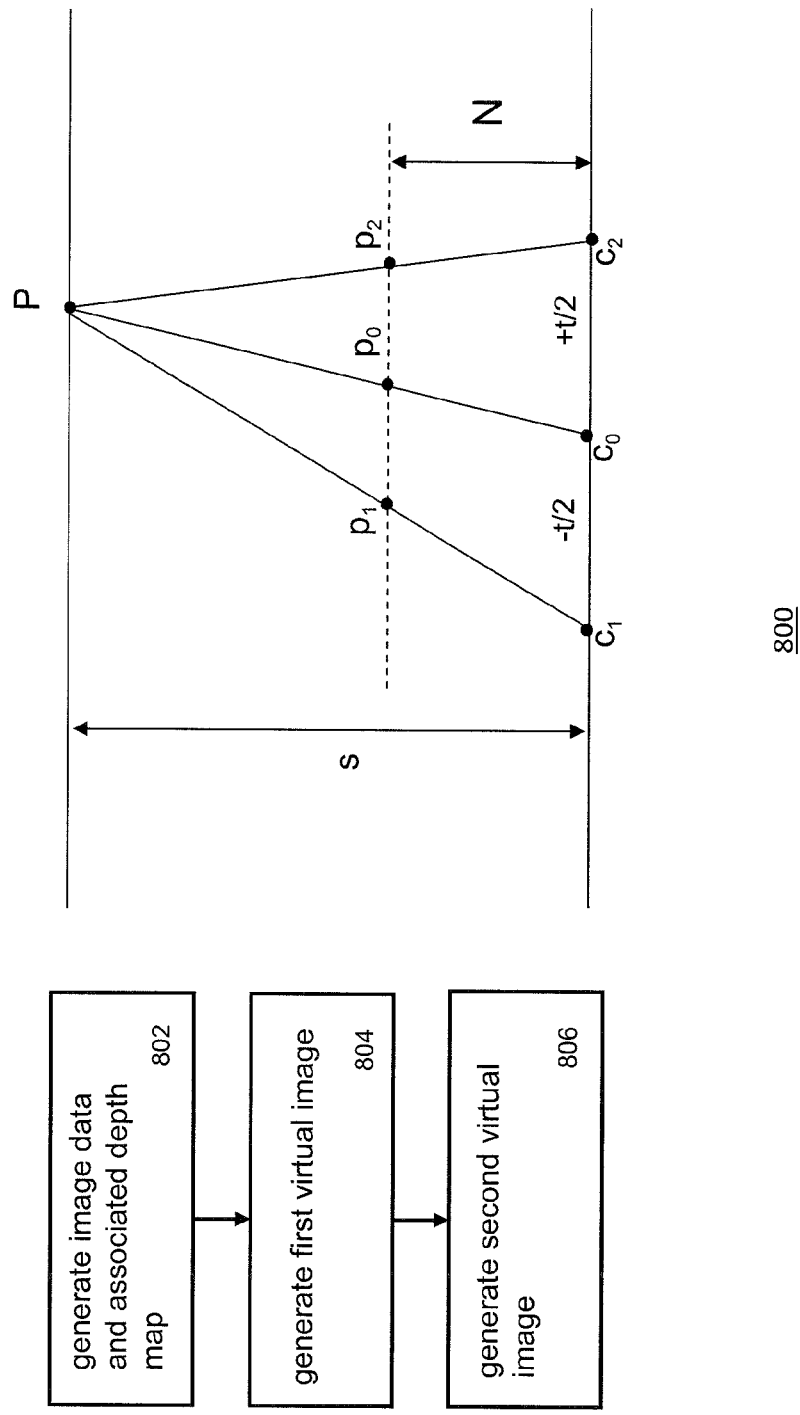
FIG. 8 depicts a method for obtaining a stereoscopic view according to one embodiment of the invention.

On the basis of the depth map various image-processing functions be realized. FIG. 8 depicts a scheme 800 for obtaining a stereoscopic view according to one embodiment of the invention. On the basis of the original camera position $C_0$ positioned at a distance s from an object P, two virtual camera positions $C_1$ and $C_2$ (one for the left eye and one for the right eye) may be defined. Each of these virtual camera positions are symmetrically displaced over a distance $-t/2$ and $+t/2$ with respect to an original camera position. Given the geometrical relation between the focal length N, $C_0$, $C_1$, $C_2$, t and s, the amount of pixel shifting required to generate the two shifted "virtual" images associated with the two virtual camera positions may be determined by the expressions:

$$P_1=p_0-(t*N)/(2s) \text{ and } P_2=p0+(t*N)/(2s);$$

Hence, on the basis of these expressions and the distance information s(i,j) in the depth map, the image processing function may calculate for each pixel $p_0(i,j)$ in the original image, pixels $p_1(i,j)$ and $p_2(i,j)$ associated with the first and second virtual image (steps 802-806). This way each pixel $p_0(i,j)$ in the original image may be shifted in accordance with the above expressions generating two shifted images $\{p_1(i,j)\}$ and $\{p_2(i,j)\}$ suitable for stereoscopic viewing.

Figure 9:
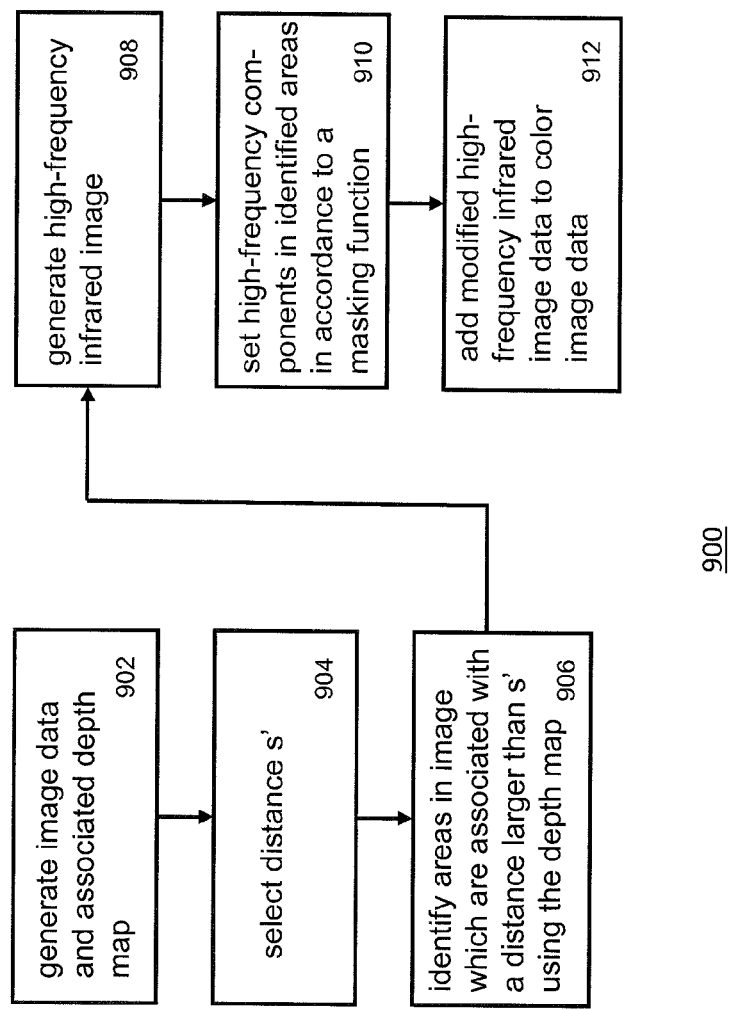
FIG. 9 depicts a method for controlling the depth of field according to one embodiment of the invention.

FIG. 9 depicts a further image processing function 900 according to one embodiment. This function allows controlled reduction of the DOF in the multi-aperture imaging system. As the multi-aperture imaging system uses a fixed lens and a fixed multi-aperture system, the optical system delivers images with a fixed (improved) DOF of the optical system. In some circumstances however, it may be desired to have a variable DOF.

In a first step 902 image data and an associated depth map may be generated. Thereafter, the function may allow selection of a particular distance s' (step 904) which may be used as a cut-off distance after which the sharpness enhancement on the basis of the high frequency infrared components should be discarded. Using the depth map, the DSP may identified first areas in an image, which are associated with at an object-to-camera distance larger than the selected distance s' (step 906) and second areas, which are associated with an object-to-camera distance smaller than the selected distance s'. Thereafter, the DSP may retrieve the high-frequency infrared image and set the high-frequency infrared components in the identified first areas to a value according to a masking function (step 910). The thus modified high frequency infrared image may then be blended (step 912) with the RGB image in a similar way as depicted in FIG. 5. That way an RGB image may be obtained wherein the objects in the image which up to a distance s' away from the camera lens are enhanced with the sharpness information obtained from the high-frequency infrared components. This way, the DOF may be reduced in a controlled way.

It is submitted that various variants are possible without departing from the invention. For example, instead of a single distance, a distance range [s1, s2] may be selected by the user of the multi-aperture system. Objects in an image may be related to distances away form the camera. Thereafter, the DSP may determine which object areas are located within this range. These areas are subsequently enhanced by the sharpness information in the high-frequency components.

Figure 10:
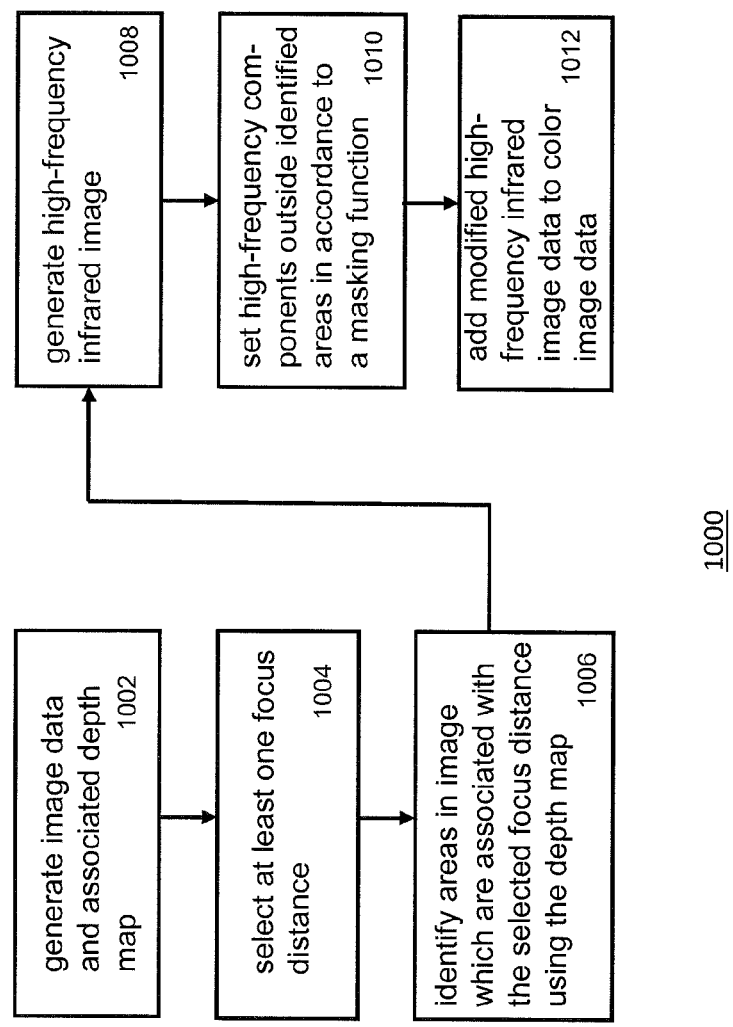
FIG. 10 depicts a method for controlling the focus point according to one embodiment of the invention.

Yet a further image processing function may relate to controlling the focus point of the camera. This function is schematically depicted in FIG. 10. In this embodiment, a (virtual) focus distance N' may be selected (step 1004). Using the depth map, the areas in the image associated with this selected focus distance may be determined (step 1006). Thereafter, the DSP may generate a high-frequency infrared image (step 1008) and set all high-frequency components outside the identified areas to a value according to a masking function (step 1010). The thus modified high-frequency infrared image may be blended with the RGB image (step 1012), thereby only enhancing the sharpness in the areas in the image associated with the focus distance N'. This way, the focus point in the image may be varied in a controllable way.

Further variants of controlling the focus distance may include selection of multiple focus distances N',N", etc. For each of these elected distances the associated high-frequency components in the infrared image may be determined. Subsequent modification of the high-frequency infrared image and blending with the color image in a similar way as described with reference to FIG. 10 may result in an image having e.g. an object at 2 meters in focus, an object at 3 meters out-of-focus and an object at 4 meters in focus. In yet another embodiment, the focus control as described with reference to FIGS. 9 and 10 may be applied to one or more particular areas in an image. To that end, a user or the DSP may select one or more particular areas in an image in which focus control is desired.

In yet another embodiment, the distance function R(s) and/or depth map may be used for processing said captured image using a known image processing function (e.g. filtering, blending, balancing, ect.), wherein one or more image process function parameters associated with such function are depending on the depth information. For example, in one embodiment, the depth information may be used for controlling the cut-off frequency and/or the roll-off of the high-pass filter that is used for generating a high-frequency infrared image. When the sharpness information in the color image and the infrared image for a certain area of the image are substantially similar, less sharpness information (i.e. high-frequency infrared components) of the infrared image is required. Hence, in that case a high-pass filter having very high cut-off frequency may be used. In contrast, when the sharpness information in the color image and the infrared image are different, a high-pass filter having lower cut-off frequency may be used so that the blur in the color image may be compensated by the sharpness information in the infrared image. This way, throughout the image or in specific part of the image, the roll-off and/or the cut-off frequency of the high-pass filter may be adjusted according to the difference in the sharpness information in the color image and the infrared image.

The generation of a depth map and the implementation of image processing functions on the basis of such depth map are not limited to the embodiments above.

Figure 11:
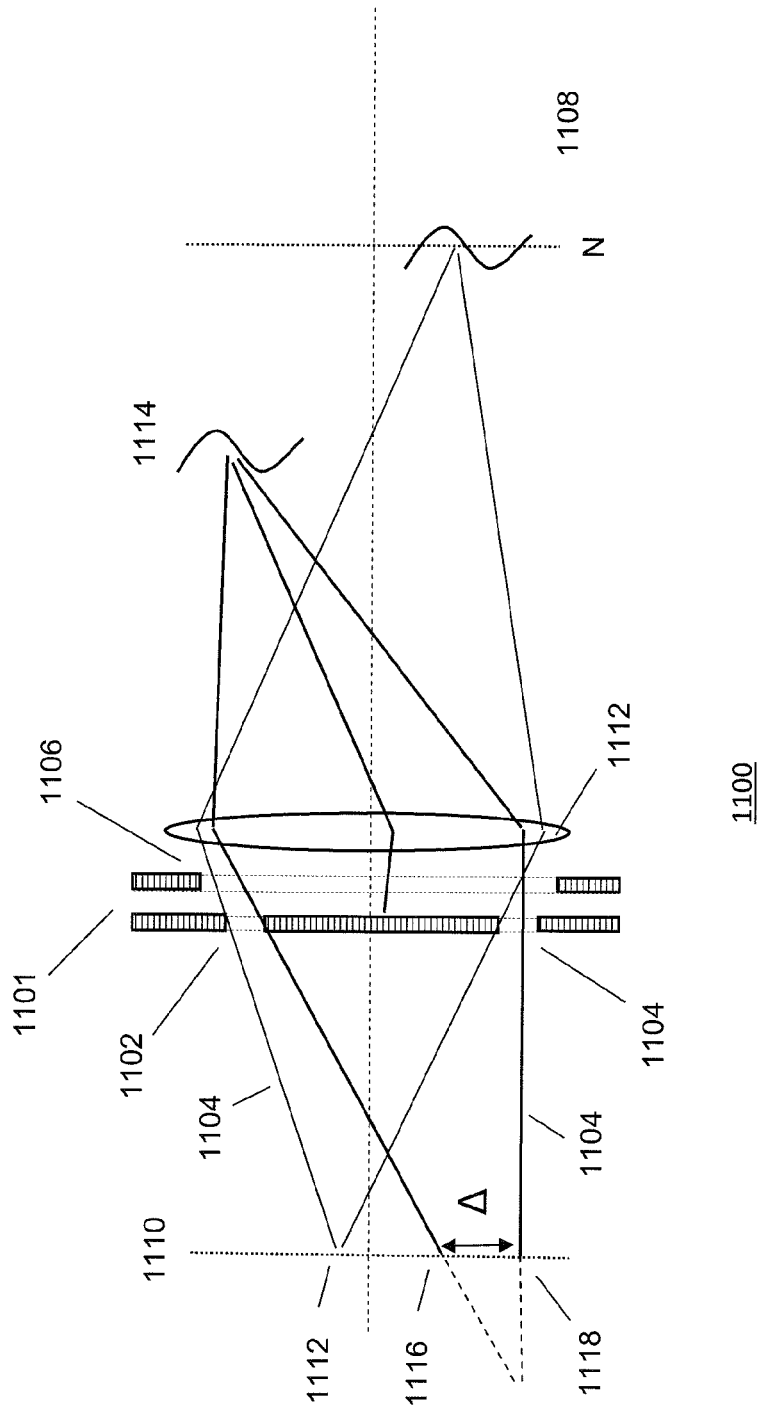
FIG. 11 depicts an optical system using a multi-aperture system according to another embodiment of the invention.

FIG. 11 depicts a schematic of a multi-aperture imaging system 1100 for generating a depth information according to further embodiment. In this embodiment, the depth information is obtained through use of a modified multi-aperture configuration. Instead of one infrared aperture in the center as e.g. depicted in FIG. 4, the multi-aperture 1101 in FIG. 11 comprises multiple, (i.e. two or more) small infrared apertures 1102,1104 at the edge (or along the periphery) of the stop forming the larger color aperture 1106. These multiple small apertures are substantially smaller than the single infrared aperture as depicted in FIG. 4, thereby providing the effect that an object 1108 that is in focus is imaged onto the imaging plane 1110 as a sharp single infrared image 1112. In contrast, an object 1114 that is out-of-focus is imaged onto the imaging plane as two infrared images 1116,1118. A first infrared image 1116 associated with a first infrared aperture 1102 is shifted over a particular distance $\Delta$ with respect to a second infrared image 1118 associated with a second infrared aperture. Instead of a continuously blurred image normally associated with an out-of-focus lens, the multi-aperture comprising multiple small infrared apertures allows the formation of discrete, sharp images. When compared with a single infrared aperture, the use of multiple infrared apertures allows the use of smaller apertures thereby achieving further enhancement of the depth of field. The further the object is out of focus, the larger the distance $\Delta$. Hence, the shift $\Delta$ between the two imaged infrared images is a function of the distance between the object and the camera lens and may be used for determining a depth function $\Delta(s)$.

The depth function $\Delta(s)$ may be determined by imaging a test object at multiple distances from the camera lens and measuring $\Delta$ at those different distances. $\Delta(s)$ may be stored in the memory of the camera, where it may be used by the DSP in one or more post-processing functions as discussed hereunder in more detail.

In one embodiment one post-processing functions may relate to the generation of a depth information associated with a single image captured by the multi-aperture imaging system comprising a discrete multiple-aperture as described with reference to FIG. 11. After simultaneously capturing both visible and infrared image signals in one image frame, the DSP may separate the color and infrared pixel signals in the captured raw mosaic image using e.g. a known demosaicking algorithm. The DSP may subsequently use a high pass filter on the infrared image data in order to obtain the high frequency components of infrared image data, which may comprise areas where objects are in focus and areas where objects are out-of-focus.

Figure 12:
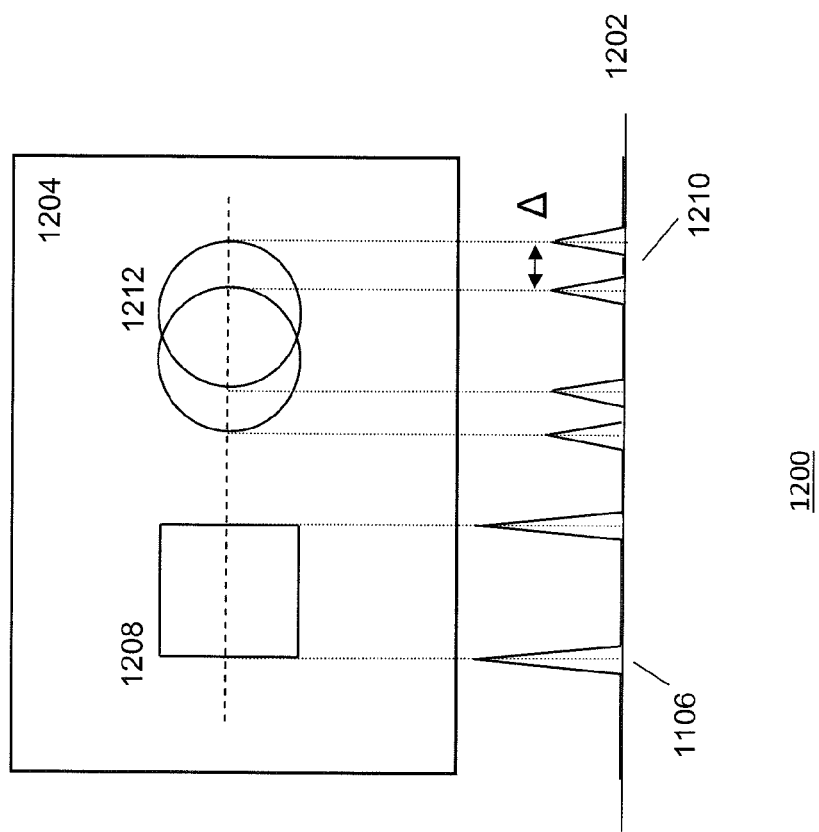
FIG. 12 depicts a method for determining a depth function according to another embodiment of the invention.

Further, the DSP may derive depth information from the high-frequency infrared image data using an autocorrelation function. This process is schematically depicted in FIG. 12. When taking the autocorrelation function 1202 of (part of) the high-frequency infrared image 1204, a single spike 1206 will appear at the high-frequency edges of an imaged object 1208 that is in focus. In contrast, the autocorrelation function will generate a double spike 1210 at the high frequency edges of an imaged object 1212 that is out-of-focus. Here the shift between the spikes represents the shift $\Delta$ between the two high-frequency infrared images, which is dependent on the distance s between the imaged object and the camera lens.

Hence, the auto-correlation function of (part of) the high-frequency infrared image, will comprise double spikes at locations in the high-frequency infrared image where objects are out-of-focus and wherein the distance between the double spike provides a distance measure (i.e. a distance away from the focal distance). Further, the auto-correlation function will comprise a single spike at locations in the image where objects are in focus. The DSP may process the autocorrelation function by associating the distance between the double spikes to a distance using the predetermined depth function $\Delta(s)$ and transform the information therein into a depth map associated with "real distances".

Using the depth map similar functions, e.g. stereoscopic viewing, control of DOF and focus point may be performed as described above with reference to FIG. 8-10. For example, Δ(s) or the depth map may be used to select high-frequency components in the infrared image which are associated with a particular selected camera-to-object distance.

Figure 13:
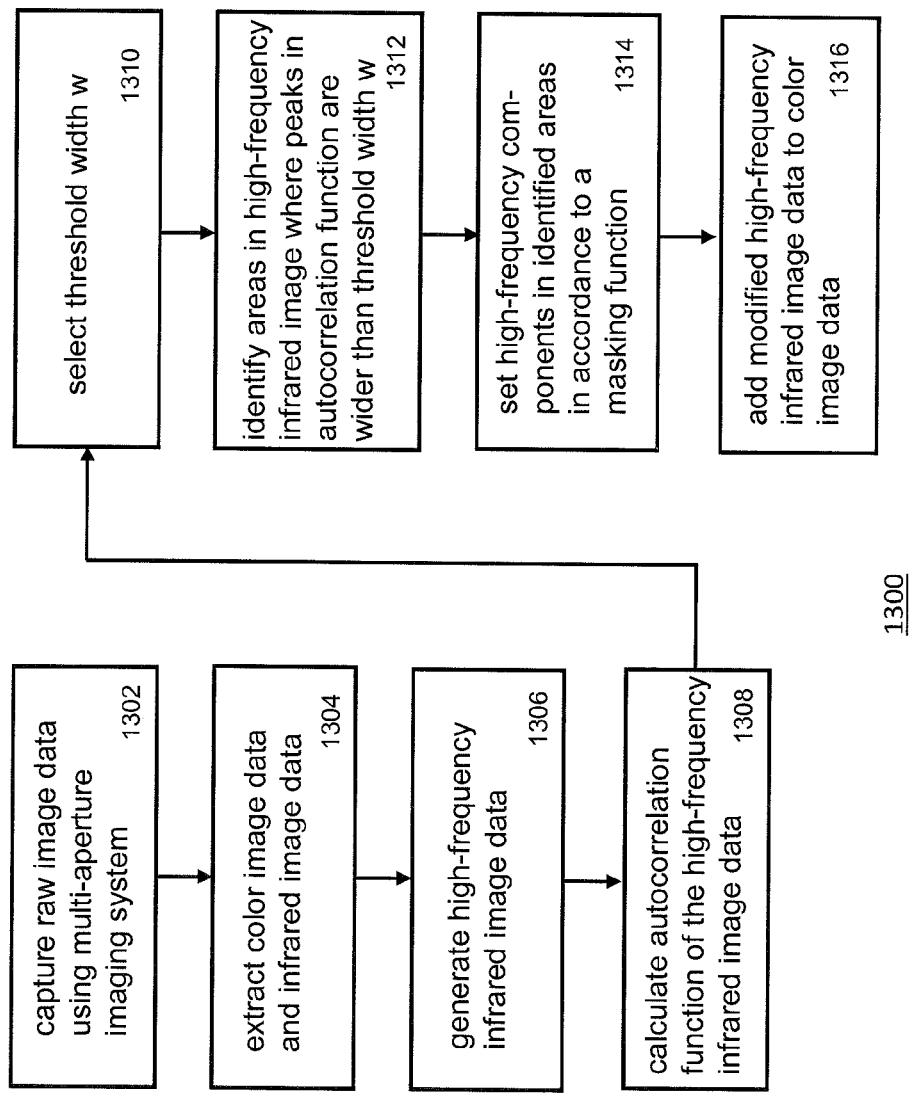
FIG. 13 depicts a method for controlling the depth of field according to another embodiment of the invention.

Certain image processing functions may be achieved by analyzing the autocorrelation function of the high-frequency infrared image. FIG. 13 depicts for example a process 1300 wherein the DOF is reduced by comparing the width of peaks in the autocorrelation function with a certain threshold width. In a first step 1302 an image is captured using a multi-aperture imaging system as depicted in FIG. 11, color and infrared image data are extracted (step 1304) and a high-frequency infrared image data is generated (step 1306). Thereafter, an autocorrelation function of the high-frequency infrared image data is calculated (step 1308). Further, a threshold width w is selected (step 1310). If a peak in the autocorrelation function associated with a certain imaged object is narrower than the threshold width, the high-frequency infrared components associated with that peak in the autocorrelation function are selected for combining with the color image data. If peaks or the distance between two peaks in the autocorrelation function associated with an edge of certain imaged object are wider than the threshold width, the high-frequency components associated with that peak in the correlation function are set in accordance to a masking function (steps 1312-1314). Thereafter, the thus modified high-frequency infrared image is processed using standard image processing techniques in order to eliminate the shift Δ0 introduced by the multi-aperture so that it may be blended with the color image data (step 1316). After blending a color image is formed a with reduced DOF is formed. This process allows control of the DOF by selecting a predetermined threshold width.

Figure 14:
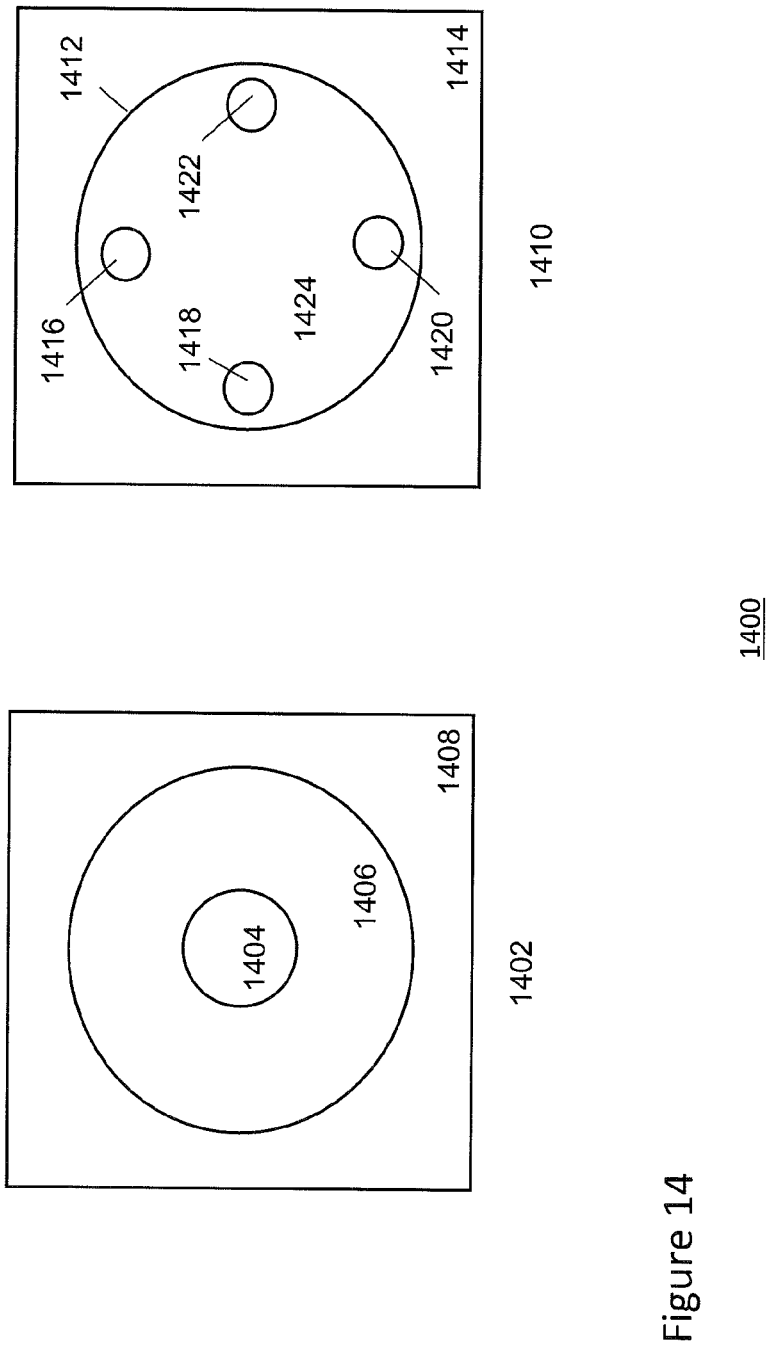
FIG. 14 depicts multi-aperture systems for use in multi-aperture imaging system.

FIG. 14 depicts two non-limiting examples 1402,1410 of a multi-aperture for use in a multi-aperture imaging system as described above. A first multi-aperture 1402 may comprise a transparent substrate with two different thin-film filters: a first circular thin-film filter 1404 in the center of the substrate forming a first aperture transmitting radiation in a first band of the EM spectrum and a second thin-film filter 1406 formed (e.g. in a concentric ring) around the first filter transmitting radiation in a second band of the EM spectrum.

The first filter may be configured to transmit both visible and infrared radiation and the second filter may be configured to reflect infrared radiation and to transmit visible radiation. The outer diameter of the outer concentric ring may be defined by an opening in an opaque aperture holder 1408 or, alternatively, by the opening defined in an opaque thin film layer 1408 deposited on the substrate which both blocks infra-read and visible radiation. It is clear for the skilled person that the principle behind the formation of a thin-film multi-aperture may be easily extended to a multi-aperture comprising three or more apertures, wherein each aperture transmits radiation associated with a particular band in the EM spectrum.

In one embodiment the second thin-film filter may relate to a dichroic filter which reflects radiation in the infra-red spectrum and transmits radiation in the visible spectrum. Dichroic filters also referred to as interference filters are well known in the art and typically comprise a number of thin-film dielectric layers of specific thicknesses which are configured to reflect infra-red radiation (e.g. radiation having a wavelength between approximately 750 to 1250 nanometers) and to transmit radiation in the visible part of the spectrum.

A second multi-aperture 1410 may be used in a multi-aperture system as described with reference to FIG. 11. In this variant, the multi-aperture comprises a relatively large first aperture 1412 defined as an opening in an opaque aperture holder 1414 or, alternatively, by the opening defined in an opaque thin film layer deposited on a transparent substrate, wherein the opaque thin-film both blocks infra-read and visible radiation. In this relatively large first aperture, multiple small infrared apertures 1416-1422 are defined as openings in a thin-film hot mirror filter 1424, which is formed within the first aperture.

Figure 15:
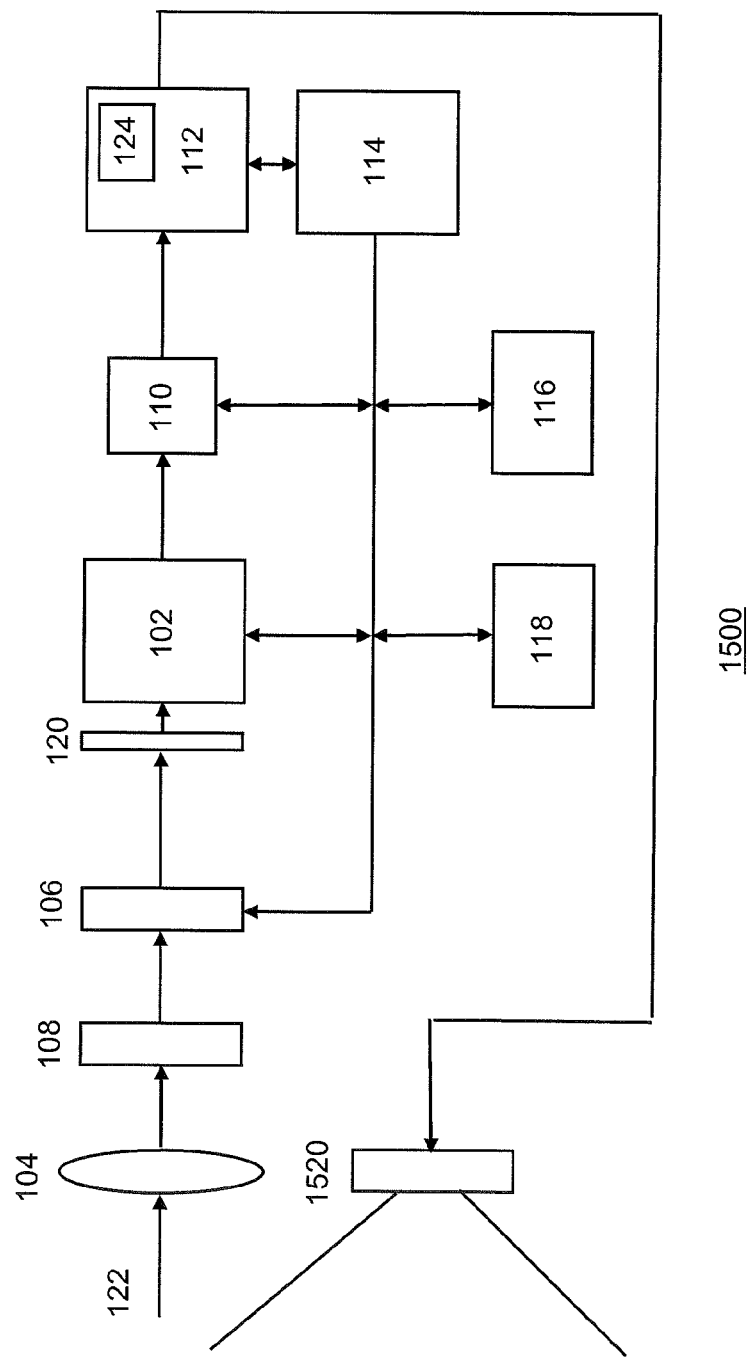
FIG. 15 depicts a multi-aperture imaging system according to another embodiment of the invention.
Figure 16:
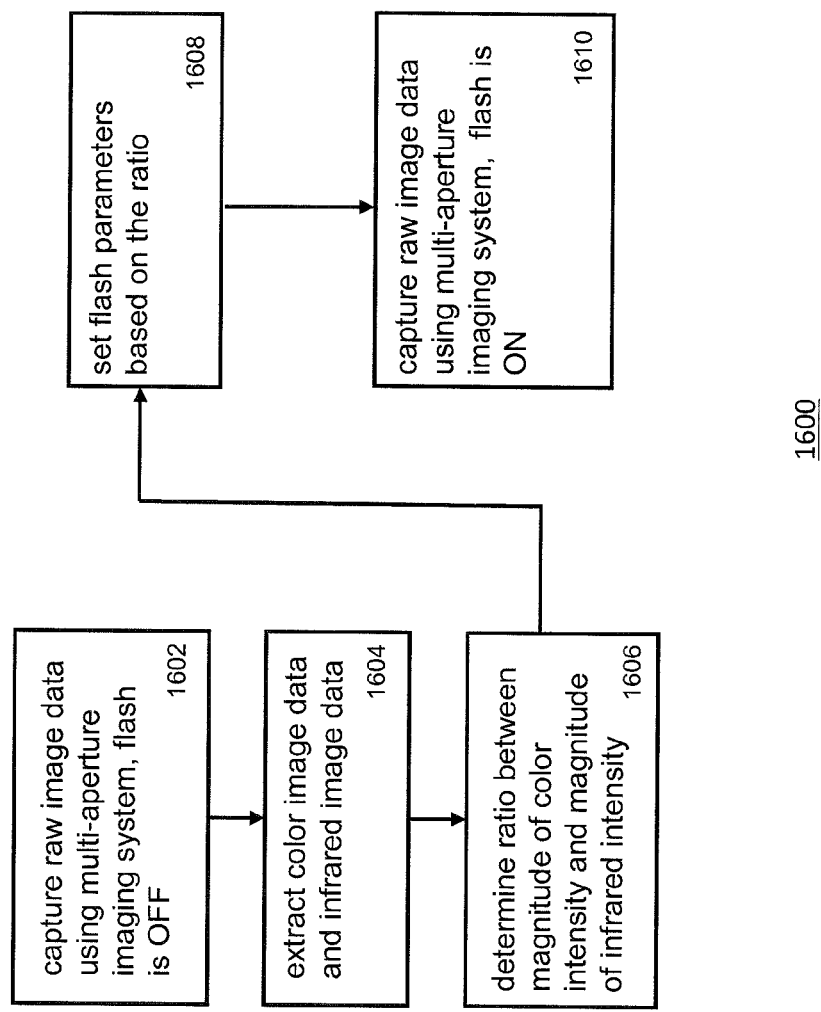
FIG. 16 depicts an image processing method for use with a multi-aperture imaging system having a flash according to one embodiment of the invention.

FIG. 15 depicts a multi-aperture imaging system 1500 according to another embodiment of the invention. The imaging system 1500 includes a lens system 104, an aperture system 108, a shutter 106, a color filter array 120, an image sensor 102, an analog to digital converter 110, a DSP 112, a central processor 114, a storage memory 116, and a program memory 118 substantially as those included in the imaging system 100 described in FIG. 1. The imaging system 1500 is configured to function at least as described above in association with FIGS. 1-14. In the interests of brevity, these discussions are not repeated here.

The imaging system 1500 differs from the imaging system 100 in that the system 1500 further includes a flash 1520. As previously described herein, image data associated of one or more objects is captured by simultaneously exposing the image sensor 102 to spectral energy associated with at least a first part of the electromagnetic spectrum using at least a first aperture and to spectral energy associated with at least a second part of the electromagnetic spectrum using at least a second aperture. In this scenario, while an image is being captured, the flash 1520 may be configured to illuminate the objects to be imaged with radiation associated with the second part of the electromagnetic spectrum. In other words, the flash 1520 may be configured to provide radiation associated with the second part of the electromagnetic spectrum in addition to such radiation that may already present in a scene (ambient, or background, radiation). After the image is captured with the flash, various techniques described above in association with FIGS. 1-14 may be applied for processing the image data.

This flash functionality may be particularly useful in a setting where the background radiation in the second part of the electromagnetic spectrum is low and/or in a setting where the second aperture is much smaller than the first aperture. Without the flash 1520 providing illumination of the objects while the images are captured, the signal reaching the sensor configured to detect radiation in the second part of the electromagnetic spectrum may be too small to be detected and analyzed correctly.

For the purpose of providing additional illumination, the flash 1520 may include a suitable radiation source, such as e.g. a diode laser, light-emitting diode or other light source. Optionally, the flash 1520 may also include suitable optics, such as e.g. a diffuser or a diffractive optical element (not shown in FIG. 15) for creating a desired pattern in the illumination provided by the flash 1520 (e.g., a speckle pattern). As shown in FIG. 15, in one embodiment, the flash 1520 may be controlled by the DSP 112. In other embodiments, the flash 1520 may be controlled by the central processor 114 or by another, separate, controller not shown in FIG. 15.

Some techniques for controlling the flash 1520 will now be described in the context of the first aperture passing visible light but not infrared radiation and the second aperture passing infrared radiation. In such an embodiment, the flash 1520 would illuminate the objects to be imaged with infrared radiation. Of course, similar teachings would hold with different radiation bands. In general, the flash 1520 may be configured to provide illumination not only in the second part of the EM spectrum, but in other parts of the EM spectrum as well. For example, the flash 1520 may be configured to provide wideband illumination which includes radiation in e.g. both infrared and RGB spectra.

In one embodiment, infrared flash parameters (such as e.g. one or more of intensity of the flash, duration of the flash, wavelength range of the flash, or derivatives thereof) may be predetermined and stored in the memory. In such an embodiment the DSP 112 may be configured to obtain the flash parameters from the memory and instruct the flash 1520 to operate according to the obtained flash parameters when the image is being captured.

In another embodiment, the DSP 112 may be configured to have access to information indicative of present lighting conditions and set flash parameters or adjust existing flash parameters according to the present lighting conditions. For example, in lighting conditions where the ambient infrared radiation intensity is high in relation to the RGB, the flash 1520 may be switched off while capturing the images. However, in conditions where the ambient infrared radiation intensity is low (either in relation to RGB or not, such as e.g. in relation to some predetermined absolute threshold), the DSP 112 may instruct the flash 1520 to illuminate the objects to be imaged while the image is captured. The DSP 112 may set the flash parameters to e.g. match the lighting conditions. In yet another embodiment, the DSP 112 may be configured to control the flash 1520 as illustrated in a method 1600 of FIG. 16. In a first step 1602, image data are captured with the flash 1520 off. Thereafter, similar to step 704 of the method 700 described above, the DSP 112 may extract color image data and infrared image data (step 1604). Thereafter, in step 1606, based on the extracted color image data and infrared image data, the DSP 112 may determine the ratio between color light intensity and infrared intensity (or derivatives thereof). Next, in step 1608, the DSP 112 may set/adjust flash parameters based on the determined ratio. The ratio e.g. may allow the DSP 112 to determine the level of the background infrared radiation and to determine what an appropriate intensity and duration of the illumination by the flash 1520. In the last step 1610, image data is captured again with the flash, while the DSP 112 instructs the flash 1520 to operate according to the flash parameters set in step 1608.

In an additional embodiment, the DSP 112 may instruct the flash 1520 to illuminate the scene while capturing the image with the intensity of the illumination set according to any of the methods described above. As the flash 1520 is illuminating the scene, the DSP 112 may be configured to receive information from the image sensor indicative of the incidence of the incoming infrared radiation, such as e.g. intensity of the received infrared radiation. The DSP 112 then continuously determines, during the capturing of the image while the flash is illuminating the scene whether saturation is reached. Once the DSP 112 determines that saturation is reached, the DSP 112 may instruct the flash 1520 to turn off. In some embodiments, the duration of the flash 1520 providing the illumination may be much shorter than the exposure time for capturing the image. For example, the flash 1520 could be configured to provide illumination for $1/1000^{th}$ of a second while the exposure may be $1/60^{th}$ of a second. Persons skilled in the art may envision that, in other embodiments, the DSP 112 may control intensity and/or duration of the illumination by the flash 1520 based on other conditions.

In the embodiments described above, intensity of the infrared radiation intensity may be also be measured by a dedicated infrared pixel, rather than by processing image data of the entire image.

Figure 17:
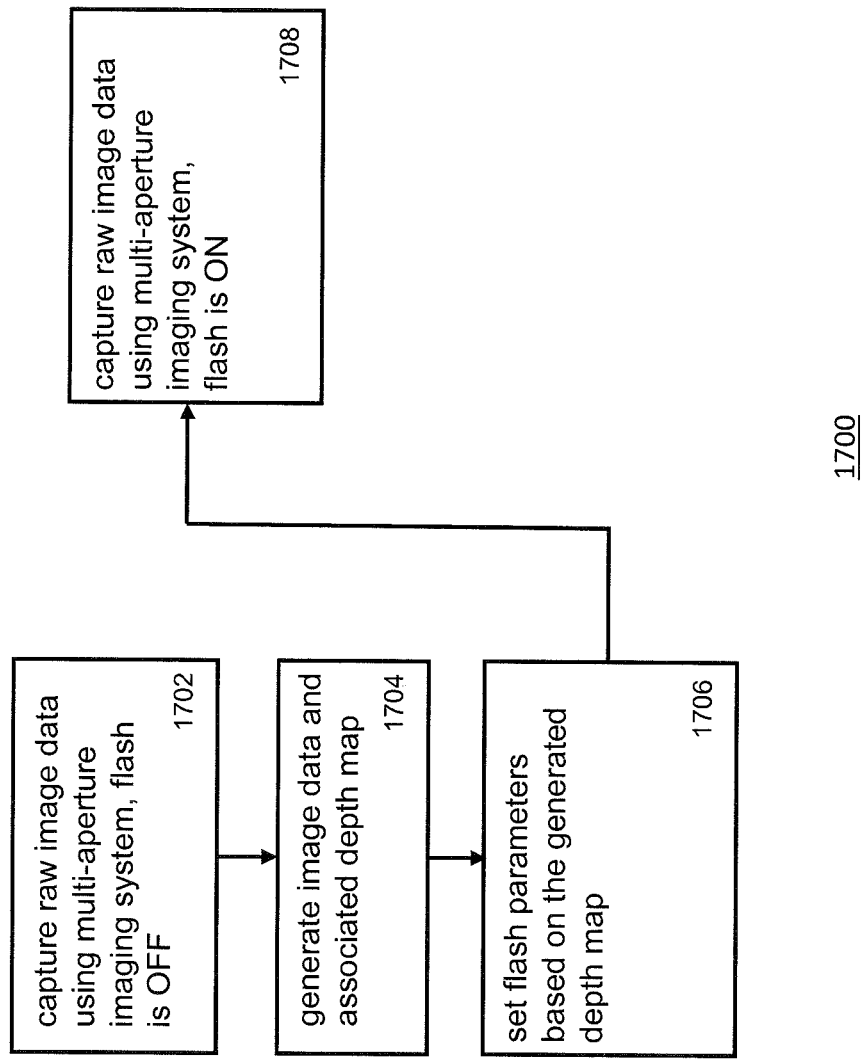
FIG. 17 depicts an image processing method for use with a multi-aperture imaging system having a flash according to another embodiment of the invention.

In yet another embodiment, the DSP 112 may be configured to control the flash 1520 as illustrated in a method 1700 of FIG. 17. In a first step 1702, image data are captured with the flash 1520 off. Thereafter, using the methods described above, the DSP 112 may generate a depth map (step 1704). Next, in step 1706, the DSP 112 may set/adjust flash parameters based on the generated depth map. As previously described herein, the depth map provides distances of objects within the scene from the imaging system. Conventional manual flashes require the photographer to estimate the distance of the object from the flash and then set the aperture and/or the duration of the flash based on this distance. By having access to the depth map, the DSP 112 may be configured to automatically set the aperture and/or the duration for which the flash fires. In the last step 1708, image data is captured again with the flash, while the DSP 112 instructs the flash 1520 to operate according to the flash parameters set in step 1706.

In various embodiments, infrared flash may function in a manner similar to a conventional visible (RGB) flash. However, using the infrared flash provides several advantages over using an RGB flash. One advantage is that infrared flash is not visible when the image is being taken. This may be less disturbing in certain situations (e.g. when the photograph is being taken at a concert). Another advantage is that it may be possible to reduce energy that is consumed in firing the flash by constraining the band of wavelengths generated for the flash to a particular limited set. This advantage may be especially relevant in applications where energy conservation is important (e.g. mobile phones). Yet another advantage of the infrared flash is that using the infrared flash allows avoiding the effect that is common with conventional flashes where objects that are too close to the flash become overexposed while objects that are far away are underexposed. Using infrared flash provides correct exposure at all distances from the camera.

All of the above discussions with respect to capturing images are also applicable for capturing video data because video is a succession of such images.

Embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. Method of forming an image of a scene, the method including the steps of:
  capturing a first image of the scene by exposing an image sensor to radiation from a first part of the electromagnetic (EM) spectrum using at least a first aperture and to radiation from a second part of the EM spectrum using at least a second aperture having a different size than the first aperture; and forming the image of the scene on the basis of image data of the first image generated by the radiation from the first part of the EM spectrum and on the basis of image data of the first image generated by radiation from the second part of the EM spectrum, wherein, simultaneously with capturing the first image, the scene is illuminated with the radiation from the second part of the EM spectrum according to predetermined one or more illumination parameters, and wherein, previously to capturing the first image, the one or more illumination parameters are predetermined by:

without the scene being illuminated with the radiation from the second part of the EM spectrum, capturing a second image of the scene by exposing the image sensor to the radiation from the first part of the EM spectrum using at least the first aperture and to the radiation from the second part of the EM spectrum using at least the second aperture, generating image data of the second image associated with the first part of the EM spectrum and image data of the second image associated with the second part of the EM spectrum, based on the image data of the second image associated with the first part of the EM spectrum and the image data of the second image associated with the second part of the EM spectrum, determining a ratio between intensity of spectral energy associated with the first part of the EM spectrum or derivative thereof and intensity of spectral energy associated with the second part of the EM spectrum or derivative thereof, and setting the one or more illumination parameters based on the determined ratio.

2. Method of forming an image of a scene, the method including the steps of:

capturing a first image of the scene by exposing an image sensor to radiation from a first part of the electromagnetic (EM) spectrum using at least a first aperture and to radiation from a second part of the EM spectrum using at least a second aperture having a different size than the first aperture; and forming the image of the scene on the basis of image data of the first image generated by the radiation from the first part of the EM spectrum and on the basis of image data of the first image generated by radiation from the second part of the EM spectrum, wherein, simultaneously with capturing the first image, the scene is illuminated with the radiation from the second part of the EM spectrum according to predetermined one or more illumination parameters, and wherein, previously to capturing the first image, the one or more illumination parameters are predetermined by:

without the scene being illuminated with the radiation from the second part of the EM spectrum, capturing a second image by exposing the image sensor to the radiation from the first part of the EM spectrum using at least the first aperture and to the radiation from the second part of the EM spectrum using at least the second aperture, generating image data of the second image associated with the first part of the EM spectrum and image data of the second image associated with the second part of the EM spectrum, generating depth information associated with the captured second image on the basis of the image data of the second image associated with the first part of the EM spectrum and the image data of the second image associated with the second part of the EM spectrum, and setting the one or more illumination parameters based on the generated depth information.

3. Method according to claim 2, wherein the depth information is generated on the basis of first sharpness information in at least one area of the image data of the second image associated with the first part of the EM spectrum and second sharpness information in at least one area of the image data of the second image associated with the second part of the EM spectrum.

4. Method according to claim 2, wherein the depth information is generated on the basis of displacement information in the image data of the second image associated with the second part of the EM spectrum, preferably on the basis of displacement information in an auto-correlation function of the high-frequency image data associated with the image data of the second image associated with the second part of the EM spectrum.

5. Method according to claim 1, further including the steps of:

during capturing the first image while the scene is illuminated with the radiation from the second part of the EM spectrum, determining whether intensity of spectral energy associated with the second part of the EM spectrum or derivative thereof has reached a predetermined threshold, and interrupting illumination of the scene with the radiation from the second part of the EM spectrum upon such determination.

6. Method according to claim 1, wherein the image sensor is simultaneously exposed to radiation from the first and second aperture.

7. Method according to claim 1, the method further comprising the steps of:

subjecting the image data of the first image associated with the first part of the EM spectrum to a high pass filter;

adding the filtered high frequency components of the image data of the first image associated with the first part of the EM spectrum to the image data of the first image associated with the second part of the EM spectrum.

8. Method according to claim 1, wherein the first part of the EM spectrum comprises at least a part of the visible spectrum and the second part of the EM spectrum comprises at least part of the invisible spectrum, preferably the infrared spectrum.

9. A multi-aperture imaging system for forming an image of a scene, comprising:

a flash;

an image sensor;

a wavelength-selective multi-aperture configured for capturing a first image by exposing the image sensor to radiation from a first part of the electromagnetic (EM) spectrum using at least a first aperture and to radiation from a second part of the EM spectrum using at least a second aperture having a different size than the first aperture; and a processing module configured for forming an image of the scene on the basis of image data of the first image generated by the radiation from the first part of the EM spectrum and on the basis of image data of the first image generated by radiation from the second part of the EM spectrum, wherein, simultaneously capturing the first image, the flash is configured for illuminating the scene with radiation from the second part of the EM spectrum according to predetermined one or more illumination parameters, and wherein, previously to capturing the first image, the one or more illumination parameters are predetermined by:
without the scene being illuminated with the radiation from the second part of the EM spectrum, the wavelength-selective multi-aperture capturing a second image of the scene by exposing the image sensor to the radiation from the first part of the EM spectrum using at least the first aperture and to the radiation from the second part of the EM spectrum using at least the second aperture,
the processing module generating image data of the second image associated with the first part of the EM spectrum and image data of the second image associated with the second part of the EM spectrum,
based on the image data of the second image associated with the first part of the EM spectrum and the image data of the second image associated with the second part of the EM spectrum, the processing module determining a ratio between intensity of spectral energy associated with the first part of the EM spectrum or derivative thereof and spectral energy associated with the second part of the EM spectrum or derivative thereof, and
the processing module setting the one or more illumination parameters based on the determined ratio.

10. A multi-aperture imaging system for forming an image of a scene, comprising:
a flash;
an image sensor;
a wavelength-selective multi-aperture configured for capturing a first image by exposing the image sensor to radiation from a first part of the electromagnetic (EM) spectrum using at least a first aperture and to radiation from a second part of the EM spectrum using at least a second aperture having a different size than the first aperture; and
a processing module configured for forming an image of the scene on the basis of image data of the first image generated by the radiation from the first part of the EM spectrum and on the basis of image data of the first image generated by radiation from the second part of the EM spectrum,
wherein, simultaneously capturing the first image, the flash is configured for illuminating the scene with radiation from the second part of the EM spectrum according to predetermined one or more illumination parameters, and wherein, previously to capturing the first image, the one or more illumination parameters are predetermined by:
without the scene being illuminated with the radiation from the second part of the EM spectrum, the wavelength-selective multi-aperture capturing a second image by exposing the image sensor to the radiation from the first part of the EM spectrum using at least the first aperture and to the radiation from the second part of the EM spectrum using at least the second aperture,
the processing module generating image data of the second image associated with the first part of the EM spectrum and image data of the second image associated with the second part of the EM spectrum,
the processing module generating depth information associated with the captured second image on the basis of the image data of the second image associated with the first part of the EM spectrum and the image data of the second image associated with the second part of the EM spectrum, and
the processing module setting the one or more illumination parameters based on the generated depth information.

11. A flash controller for use in a multi-aperture imaging system comprising:
a flash;
an image sensor;
a wavelength-selective multi-aperture configured for capturing a first image by exposing the image sensor to radiation from a first part of the electromagnetic (EM) spectrum using at least a first aperture and to radiation from a second part of the EM spectrum using at least a second aperture having a different size than the first aperture; and
a processing module configured for forming an image of the scene on the basis of image data of the first image generated by the radiation from the first part of the EM spectrum and on the basis of image data of the first image generated by radiation from the second part of the EM spectrum,
wherein, simultaneously capturing the first image, the flash is configured for illuminating the scene with radiation from the second part of the EM spectrum according to predetermined one or more illumination parameters, and wherein, previously to capturing the first image, the one or more illumination parameters are predetermined by:
without the scene being illuminated with the radiation from the second part of the EM spectrum, the wavelength-selective multi-aperture capturing a second image of the scene by exposing the image sensor to the radiation from the first part of the EM spectrum using at least the first aperture and to the radiation from the second part of the EM spectrum using at least the second aperture,
the processing module generating image data of the second image associated with the first part of the EM spectrum and image data of the second image associated with the second part of the EM spectrum,
based on the image data of the second image associated with the first part of the EM spectrum and the image data of the second image associated with the second part of the EM spectrum, the processing module determining a ratio between intensity of spectral energy associated with the first part of the EM spectrum or derivative thereof and spectral energy associated with the second part of the EM spectrum or derivative thereof, and
the processing module setting the one or more illumination parameters based on the determined ratio,
the controller comprising:
an input for receiving the image data of the second image associated with the first part of the EM spectrum and image data of the second image associated with the second part of the EM spectrum; and
a processing unit for:
determining a ratio between intensity of spectral energy associated with the first part of the EM spectrum or derivative thereof and spectral energy associated with the second part of the EM spectrum or derivative thereof based on the image data of the second image associated with the first part of the EM spectrum and the image data of the second image associated with the second part of the EM spectrum,
and setting the one or more illumination parameters based on the determined ratio, or generating depth information associated with the captured second image on the basis of the image data of the second image associated with the first part of the EM spectrum and the image data of the second image associated with the second part of the EM spectrum, and setting the one or more illumination parameters based on the generated depth information.

12. A digital camera comprising a multi-aperture imaging system, the multi-aperture imaging system comprising:
a flash;
an image sensor;
a wavelength-selective multi-aperture configured for capturing a first image by exposing the image sensor to radiation from a first part of the electromagnetic (EM) spectrum using at least a first aperture and to radiation from a second part of the EM spectrum using at least a second aperture having a different size than the first aperture; and
a processing module configured for forming an image of the scene on the basis of image data of the first image generated by the radiation from the first part of the EM spectrum and on the basis of image data of the first image generated by radiation from the second part of the EM spectrum,
wherein, simultaneously capturing the first image, the flash is configured for illuminating the scene with radiation from the second part of the EM spectrum according to predetermined one or more illumination parameters, and wherein, previously to capturing the first image, the one or more illumination parameters are predetermined by:
without the scene being illuminated with the radiation from the second part of the EM spectrum, the wavelength-selective multi-aperture capturing a second image of the scene by exposing the image sensor to the radiation from the first part of the EM spectrum using at least the first aperture and to the radiation from the second part of the EM spectrum using at least the second aperture,
the processing module generating image data of the second image associated with the first part of the EM spectrum and image data of the second image associated with the second part of the EM spectrum,
based on the image data of the second image associated with the first part of the EM spectrum and the image data of the second image associated with the second part of the EM spectrum, the processing module determining a ratio between intensity of spectral energy associated with the first part of the EM spectrum or derivative thereof and spectral energy associated with the second part of the EM spectrum or derivative thereof, and
the processing module setting the one or more illumination parameters based on the determined ratio.

13. A digital camera comprising a multi-aperture imaging system, the multi-aperture imaging system comprising:
a flash;
an image sensor;
a wavelength-selective multi-aperture configured for capturing a first image by exposing the image sensor to radiation from a first part of the electromagnetic (EM) spectrum using at least a first aperture and to radiation from a second part of the EM spectrum using at least a second aperture having a different size than the first aperture; and
a processing module configured for forming an image of the scene on the basis of image data of the first image generated by the radiation from the first part of the EM spectrum and on the basis of image data of the first image generated by radiation from the second part of the EM spectrum,
wherein, simultaneously capturing the first image, the flash is configured for illuminating the scene with radiation from the second part of the EM spectrum according to predetermined one or more illumination parameters, and wherein, previously to capturing the first image, the one or more illumination parameters are predetermined by:
without the scene being illuminated with the radiation from the second part of the EM spectrum, the wavelength-selective multi-aperture capturing a second image by exposing the image sensor to the radiation from the first part of the EM spectrum using at least the first aperture and to the radiation from the second part of the EM spectrum using at least the second aperture,
the processing module generating image data of the second image associated with the first part of the EM spectrum and image data of the second image associated with the second part of the EM spectrum,
the processing module generating depth information associated with the captured second image on the basis of the image data of the second image associated with the first part of the EM spectrum and the image data of the second image associated with the second part of the EM spectrum, and
the processing module setting the one or more illumination parameters based on the generated depth information.

14. The digital camera according to claim 12, wherein the digital camera comprises a camera for use in a mobile terminal.

* * * * *